US008218083B2

(12) United States Patent
Asamura et al.

(10) Patent No.: US 8,218,083 B2
(45) Date of Patent: Jul. 10, 2012

(54) NOISE REDUCER, NOISE REDUCING METHOD, AND VIDEO SIGNAL DISPLAY APPARATUS THAT DISTINGUISHES BETWEEN MOTION AND NOISE

(75) Inventors: Masako Asamura, Tokyo (JP); Koji Minami, Tokyo (JP); Chihiro Sakuwa, Tokyo (JP); Toshihiro Gai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1444 days.

(21) Appl. No.: 11/723,121

(22) Filed: Mar. 16, 2007

(65) Prior Publication Data
US 2007/0229709 A1 Oct. 4, 2007

(30) Foreign Application Priority Data
Mar. 30, 2006 (JP) ................................. 2006-094078

(51) Int. Cl.
*H04N 5/21* (2006.01)
*H04N 5/14* (2006.01)
(52) U.S. Cl. ........................................ 348/620; 348/701
(58) Field of Classification Search .................. 348/241, 348/246, 620, 701, 251, 606; 382/265, 275; 345/611, 613, 614
See application file for complete search history.

(56) References Cited

U.S. PATENT DOCUMENTS

| | | | | |
|---|---|---|---|---|
| 4,485,403 A * | 11/1984 | Illetschko | ...................... | 348/607 |
| 4,539,594 A * | 9/1985 | Illetschko | ...................... | 348/620 |
| 4,549,213 A * | 10/1985 | Illetschko | ...................... | 348/620 |
| 4,652,907 A * | 3/1987 | Fling | .............................. | 348/621 |
| 4,951,137 A * | 8/1990 | Kisou et al. | ................... | 348/169 |
| 5,025,316 A * | 6/1991 | Darby | ............................ | 348/620 |
| 5,185,664 A * | 2/1993 | Darby | ............................ | 348/620 |
| 5,404,178 A * | 4/1995 | Kondo et al. | ................. | 348/618 |
| 5,715,000 A * | 2/1998 | Inamori | ........................ | 348/241 |
| 5,969,777 A * | 10/1999 | Mawatari | ................. | 375/240.26 |
| 6,259,489 B1 * | 7/2001 | Flannaghan et al. | .......... | 348/620 |
| 6,591,398 B1 * | 7/2003 | Kondo et al. | ..................... | 714/2 |
| 7,130,481 B2 * | 10/2006 | Yu | ................................. | 382/261 |
| 7,190,841 B2 * | 3/2007 | Takahashi | ..................... | 382/254 |
| 7,375,760 B2 * | 5/2008 | Kempf et al. | ................. | 348/441 |
| 7,453,523 B2 * | 11/2008 | Yamauchi | ..................... | 348/607 |
| 2002/0080882 A1 * | 6/2002 | Kitagawa | ................. | 375/240.29 |
| 2003/0052979 A1 * | 3/2003 | Soga et al. | ..................... | 348/241 |
| 2005/0168651 A1 * | 8/2005 | Morino | ......................... | 348/700 |

FOREIGN PATENT DOCUMENTS

| | | |
|---|---|---|
| JP | 03066230 A | 3/1991 |
| JP | 05161156 A | 6/1993 |
| JP | 5-328174 A | 12/1993 |
| JP | 8-172551 A | 7/1996 |
| JP | 9-81754 A | 3/1997 |
| JP | 2748578 B2 | 2/1998 |

(Continued)

*Primary Examiner* — Victor Kostak
(74) *Attorney, Agent, or Firm* — Birch, Stewart, Kolasch & Birch, LLP

(57) ABSTRACT

A video noise reducer processes a frame difference signal equal to the difference between the video signal of the current frame and the video signal of the preceding frame or the difference between the video signal of the current frame and the noise-reduced video signal of the preceding frame to obtain a motion detection signal and a noise detection signal. The difference between the motion detection signal and the noise detection signal is then processed to obtain a recursion coefficient. The frame difference signal is multiplied by the recursion coefficient and the resulting product is additively combined with the video signal of the current frame to reduce noise without generating significant motion artifacts.

19 Claims, 12 Drawing Sheets

FOREIGN PATENT DOCUMENTS

| | | |
|---|---|---|
| JP | 3144860 B2 | 1/2001 |
| JP | 2002-33942 A | 1/2002 |
| JP | 2003-219208 A | 7/2003 |
| JP | 2004-96628 A | 3/2004 |
| JP | 2005-347821 A | 12/2005 |

* cited by examiner

PIXEL BEING PROCESSED

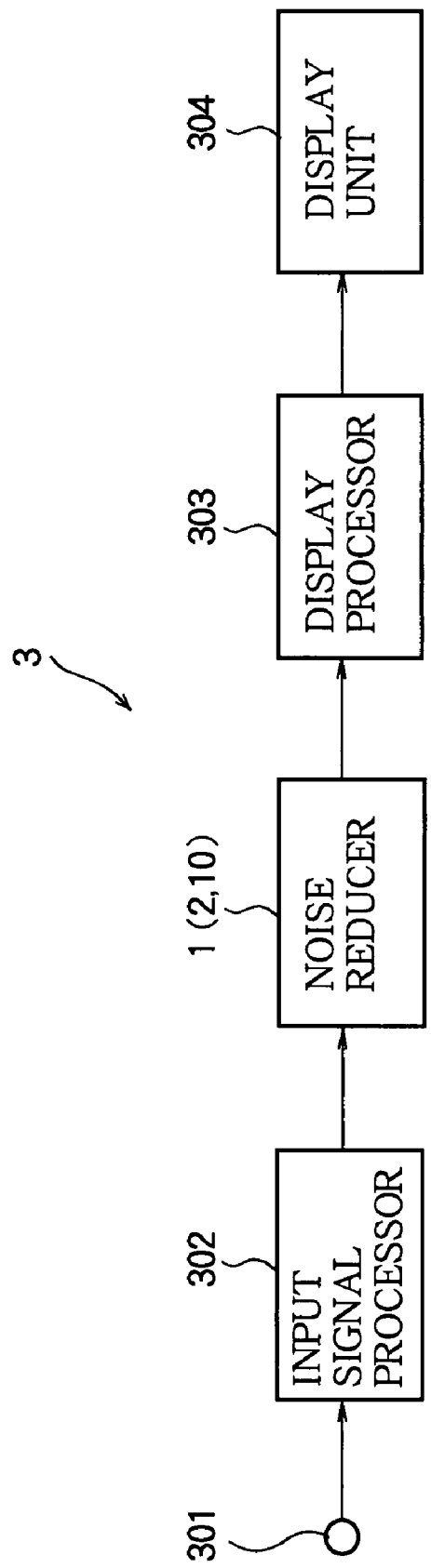

NOISE REDUCER, NOISE REDUCING METHOD, AND VIDEO SIGNAL DISPLAY APPARATUS THAT DISTINGUISHES BETWEEN MOTION AND NOISE

BACKGROUND OF THE INVENTION

1. Field of the Invention

The present invention relates to a noise reducer and noise reducing method for removing noise from a video signal, to a video signal display apparatus using the noise reducer or noise reducing method, and more particularly to a noise reducer, noise reducing method, and video signal display apparatus in which motion sensitivity and noise sensitivity can be set independently.

2. Description of the Related Art

Because of the increasing size of the screens of television receivers and other display apparatus and the increasing quality of the pictures displayed on them, high reliability is required in video signal processing; if an input video signal or image signal includes unnecessary signal components, generally referred to as noise components, the resulting image blemishes can be glaringly conspicuous. Noise reduction (NR) apparatus exists for improving the quality of video signals by reducing their noise components: for example, since noise normally lacks frame-to-frame coherence (correlation from frame to frame on the time axis), many noise reducers that cancel signal components lacking such coherence have been proposed. These noise reducers are described as three dimensional (3D) because they operate in the time dimension as well as in two spatial dimensions.

A 3D noise reducer basically operates by taking the difference between the video signals in the current frame and the preceding frame, multiplying the resulting frame-to-frame difference signal by a so-called recursion coefficient, and subtracting the product from the video signal of the current frame (or adding the product, if the recursion coefficient is negative). A problem with this basic scheme is that although it reduces noise, it also generates motion artifacts: moving parts of the image may be smeared, sometimes acquiring comet-like tails, and after-images may appear. To reduce these motion artifacts, many known noise reducers detect motion in the video signal from, for example, the frame-to-frame difference value and reduce the recursion coefficient in image areas where motion is present. The following Japanese Patent Application Publications (JP) disclose noise reducers of this type.

JP 2003-219208 (FIGS. 1 and 4) discloses a noise reducer that distinguishes between noise and motion by detecting the maximum and mean values of the frame-to-frame difference data over a certain interval, and generates setting information and a control signal for on-off control of noise reduction from the detected maximum and mean values.

JP 2002-33942 (FIGS. 1 and 3) discloses a noise reducer that detects the differences between picture element (pixel) signals over a plurality of frames as a motion index and sets the noise recursion gain accordingly.

JP 2005-347821 (FIGS. 1 and 2) discloses a noise reducer that performs noise reducing processing according to image-brightness by controlling the noise recursion coefficient according to both the result of motion detection from the frame-to-frame difference and the luminance level of the image signal.

JP 9-81754 (FIG. 1) discloses a noise reducer that makes motion decisions on the basis of frame-to-frame differences, checks the results of the decisions with a majority rule circuit, corrects scatter in the decision results, and uses the corrected results as a motion signal to determine the noise recursion coefficient, a scheme that is good at detecting motion.

JP 2004-96628 (FIG. 3) discloses a noise reducer that uses motion vectors to obtain a motion-corrected field-to-field difference signal, detects motion separately in the high and low frequency bands of this signal, and controls the amount of feedback in the high-frequency band to obtain improved after-image reduction.

Although these conventional noise reducers mitigate motion artifacts to some extent, they still suffer from a common problem. The frame-to-frame difference includes both differences due to motion and differences due to noise. If the motion detection sensitivity is increased, noise may be mistakenly detected as motion, with the result that noise reduction is suppressed precisely when it is needed. If the motion detection sensitivity is reduced, however, not only do visible motion artifacts remain, but when a video signal with large noise values due to automatic gain control is processed, noise is still mistakenly detected as motion, so that prominent noise components are not reduced.

SUMMARY OF THE INVENTION

An object of the present invention is to provide a noise reducer, a noise reducing method, and a video signal display apparatus that can distinguish between motion and noise accurately, even when the video signal includes noise components with large values, and reduce noise effectively while also reducing motion artifacts.

A 3D noise reducer according to the present invention includes:

a subtractor that receives the video signal of the current frame and the video signal of the preceding frame or the noise-reduced video signal of the preceding frame, takes the difference between the received signals, and outputs a frame difference signal;

a motion detector that processes the frame difference signal to detect motion in the video signal and derive a motion detection signal indicating a motion level;

a noise decision unit that processes a high-frequency component of the frame difference signal to detect noise and outputs a noise detection signal indicating a noise level;

a motion level calculator that obtains a motion level signal from the motion detection signal and the noise detection signal by a process that includes at least taking a difference between these two signals;

a coefficient calculation unit that converts the motion level signal to a recursion coefficient;

a multiplier that multiplies the frame difference by the recursion coefficient to obtain a noise recursion quantity; and an adder that additively combines the noise recursion quantity and the video signal of the current frame to obtain a noise-reduced video signal, which is output for the current frame.

A feature of the invented noise reducer is that, since noise is subtracted from the motion detection signal, noise and motion can both be detected with appropriate sensitivity, so the recursion coefficient can be set so as to reduce even large noise components without generating large motion artifacts.

BRIEF DESCRIPTION OF THE DRAWINGS

In the attached drawings:

FIG. 14 is a block diagram showing an example of the structure of a video signal display apparatus according to a third embodiment.

DETAILED DESCRIPTION OF THE INVENTION

Figure 1:
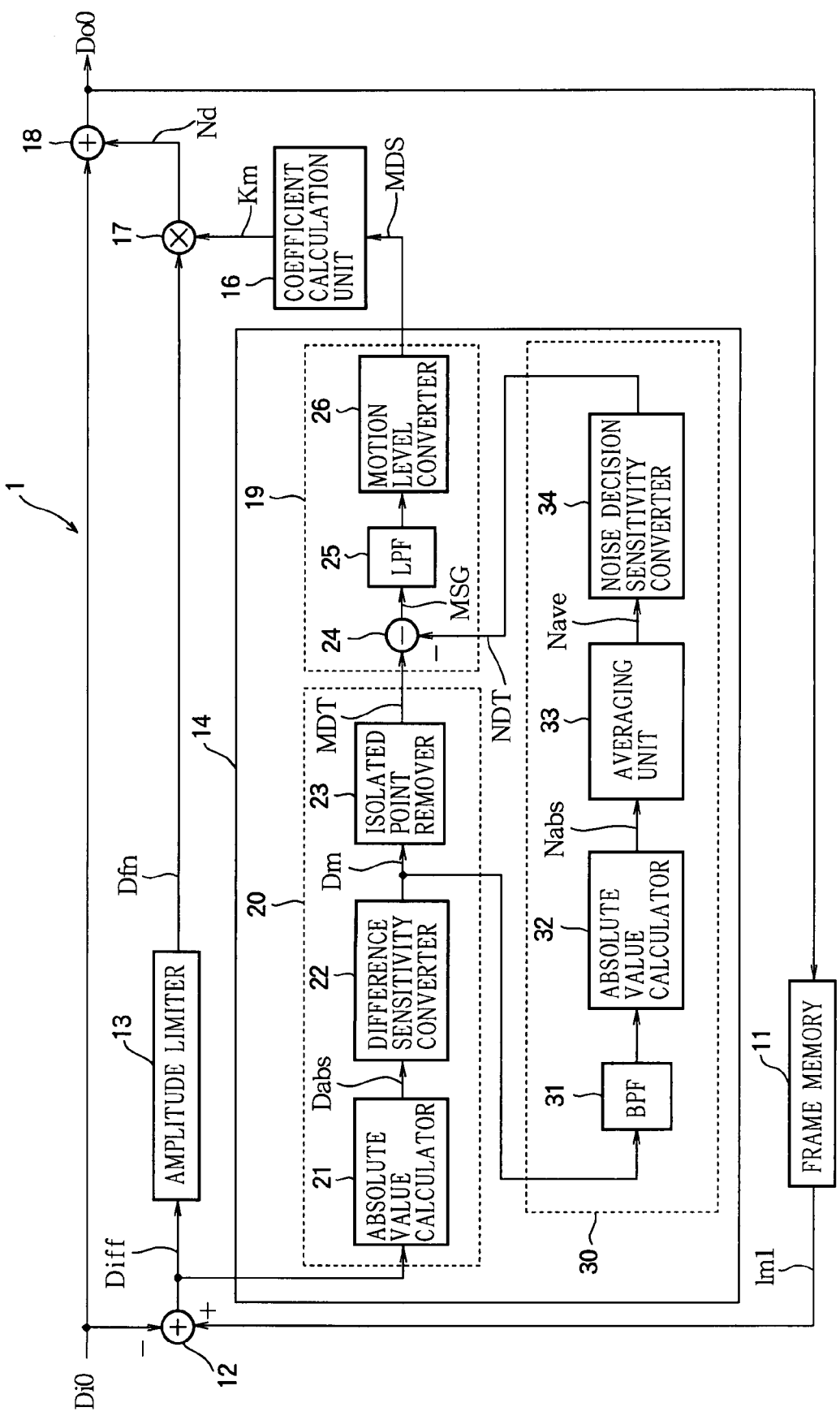
FIG. 1 is a block diagram showing an example of the structure of a noise reducer according to a first embodiment of the invention.

Embodiments of the invention will now be described with reference to the attached drawings, in which like elements are indicated by like reference characters.

First Embodiment

Figures 7A, 7B, 8:
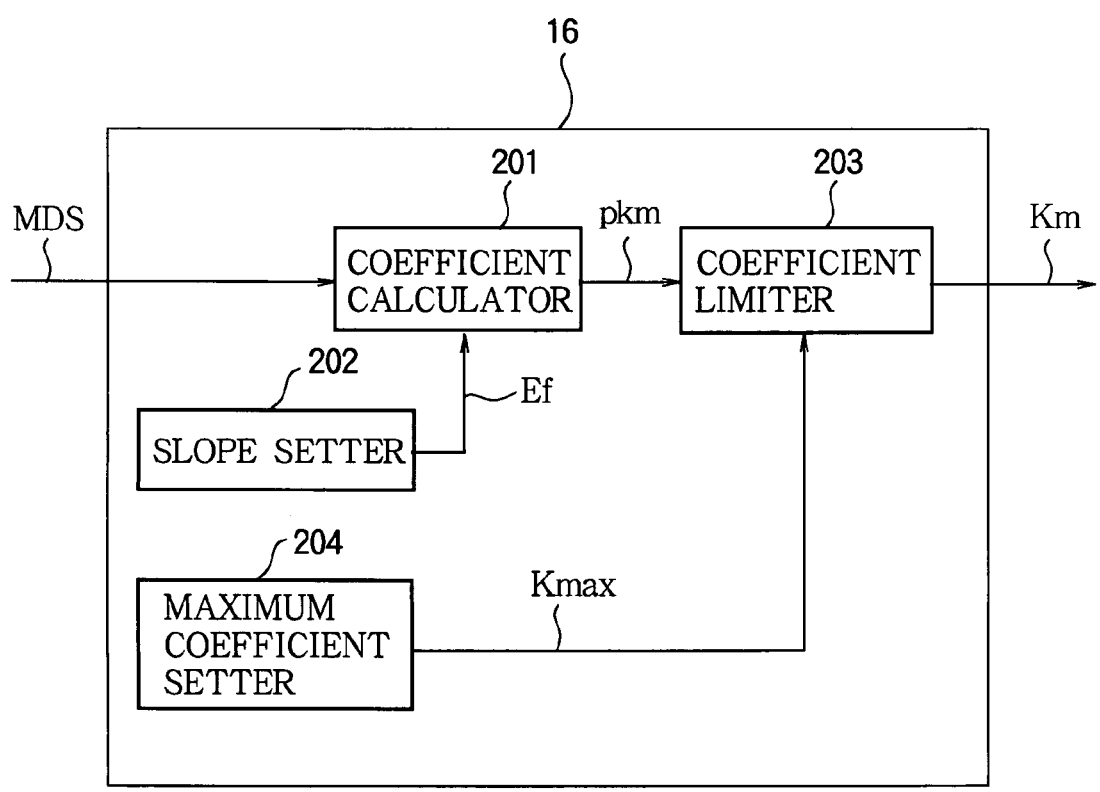
FIGS. 7A and 7B are diagrams showing examples of the operation of the bandpass filter in the noise decision unit in FIG. 1.
FIG. 8 is a block diagram showing an example of the structure of the coefficient calculation unit in FIG. 1.

The first embodiment is a frame recursive noise reducer employing a 3D noise reduction method that operates on the noise-reduced video signal of the preceding frame, as illustrated by the block diagram in FIG. 1 and the flowchart in FIG. 8.

Referring to FIG. 1, the noise reducer 1 receives a video signal denoted Di0 (also referred to below as the input signal, input frame signal, or current frame signal). The noise reducer 1 comprises a frame memory 11 that delays the video signal Di0 by one frame to obtain a delayed video signal Im1, a subtractor 12 that takes a difference between Di0 from Im1 to obtain a frame difference signal Diff, an amplitude limiter 13 that limits the frame difference signal to a predetermined range, a motion and noise detector 14 that processes the frame difference signal Diff to obtain a motion level signal MDS indicating the motion level in the frame difference, a coefficient calculation unit 16 that converts the motion level MDS to a recursion coefficient Km, a multiplier 17 that multiplies the limited frame difference Dfn by the recursion coefficient Km to obtain a noise recursion quantity Nd, and an adder 18 that additively combines the noise recursion quantity Nd with the input signal Di0 to obtain an output signal Di0 for the current frame.

In the present embodiment, the recursion coefficient Km is non-negative, subtractor 12 subtracts Di0 from Im1, and adder 18 adds Nd to Di0, but in general, the additive operation performed by adder 18 may be either an addition or a subtraction operation. For example, subtractor 12 may subtract Im1 from Di0 and adder 18 may subtract Nd from Di0, producing the same result as in FIG. 1.

The motion level signal MDS output by the motion and noise detector 14 indicates how much of the frame-to-frame difference is due to motion. The motion and noise detector 14 comprises a motion level calculator 19, a motion detector 20, and a noise decision unit 30. The motion detector 20 adjusts the sensitivity of motion detection by transforming the frame-to-frame difference signal Diff to obtain a transformed difference signal Dm, and then processes the transformed difference signal Dm to obtain a motion detection signal MDT from which isolated noise has been removed. The noise decision unit 30 processes a high-frequency component of the transformed difference signal Dm to obtain a smoothed and sensitivity-adjusted noise detection signal NDT indicating the high-frequency noise level in the frame difference signal.

The motion level calculator 19 comprises a subtractor 24 that takes the difference between the motion detection signal MDT and the noise detection signal NDT, a low-pass filter (LPF) 25 that spatially broadens the resulting difference signal MSG, and a motion level converter 26 that converts the spatially broadened signal to obtain the motion level signal MDS.

The motion detector 20 comprises an absolute value calculator 21 that takes the absolute value Dabs of the frame difference signal Diff, a difference sensitivity converter 22 that transforms the absolute value Dabs nonlinearly to obtain a transformed difference signal Dm, and an isolated point remover 23 that applies a majority rule process to the transformed difference signal Dm to obtain the motion detection signal MDT.

The noise decision unit 30 comprises a bandpass filter (BPF) 31 that extracts a high-frequency component of the transformed difference signal Dm, an absolute value calculator 32 that takes the absolute value of the high-frequency component at each pixel (picture element) and outputs the absolute value as an absolute noise signal Nabs, an averaging unit 33 that obtains an averaged noise signal Nave by taking the mean value of the absolute noise signal Nabs in a vicinity of each pixel, and a noise decision sensitivity converter 34) that processes the averaged noise signal Nave nonlinearly to generate the noise detection signal NDT.

The frame memory 11 delays the noise-reduced video signal DoO output from the noise reducer 1 by one frame and outputs the video signal Im1 of the preceding frame (also referred to below as the preceding frame signal). If the input video signal is divided into fields, as is the case with an interlaced signal, the frame memory 11 stores the input signal on a per-field basis and is referred to as a field memory. If an interlaced signal is input, since the frame memory 11 delays the interlaced signal by one frame, the interlaced signal is delayed by two fields. The pixels in the preceding frame signal Im1 output from the frame memory 11 correspond to the pixels at the same positions in the current frame input signal Di0.

The subtractor 12 receives the current frame signal Di0 and the preceding frame signal Im1 and subtracts the current frame signal Di0 from the preceding frame signal Im1 to obtain the frame difference signal Diff expressing the difference between the signals Di0 and Im1. This frame difference signal Diff includes motion and noise components in the video signal. If the frame difference signal Diff is equal to zero, the pixel is completely stationary (more precisely, either motion and noise are completely absent, or motion and noise exactly cancel each other out). If motion or noise is present (or both are present and they do not completely cancel each other out), the frame difference signal Diff has a non-zero value. Very generally speaking, small values tend to be due to noise and large values tend to be due to motion.

The amplitude limiter 13 limits the amplitude of the frame difference signal Diff from the subtractor 12 to a predetermined range (e.g., between ±dTh, where dTh is a suitable non-zero value), and outputs the limited frame difference Dfn as a possible noise component of the input signal Di0 at each pixel.

The motion and noise detector 14 receives the frame difference signal Diff from the subtractor 12. The motion and noise detector 14 processes the frame difference signal Diff obtained from the difference between the input frame signal Di0 and the signal Im1 of the preceding frame, detects motion and noise in the video signal, obtains the motion detection signal MDT and the noise detection signal NDT, and outputs the motion level signal MDS indicating the motion level in the frame difference.

The motion and noise detector 14 sets the motion level signal MDS to a predetermined positive integer value MD1 if the frame difference Diff appears to be completely due to motion, to zero if motion appears to be absent, either because the frame difference is zero or because the frame difference is due completely to noise, and to intermediate integer values to indicate intermediate levels of motion. The motion scale accordingly has (MD1+1) levels from zero to MD1. It will be assumed, as an example, that the highest level is eight (MD1=8), so the scale has nine levels ranging from MDS=0, indicating a completely stationary pixel, to MDS=8, indicating a definitely moving pixel. The motion level signal MDS is sent to the coefficient calculation unit 16.

Next, the structure of the motion and noise detector 14 will be described in detail with reference to FIGS. 1 to 7.

The motion detector 20 in the motion and noise detector 14 receives the frame difference signal Diff from the subtractor 12, takes the absolute value Dabs of the frame difference signal Diff, transforms the absolute value Dabs nonlinearly to obtain the transformed difference signal Dm, sends the transformed difference signal Dm to the noise decision unit 30, and generates the motion detection signal MDT.

The absolute value calculator 21 in the motion detector 20 receives the frame difference signal Diff from the subtractor 12. The absolute value calculator 21 takes the absolute value Dabs of the frame difference signal Diff, and outputs this absolute difference value Dabs to the difference sensitivity converter 22.

The difference sensitivity converter 22 receives the absolute difference value Dabs from the absolute value calculator 21 and transforms it by a nonlinear process in which, for example, the absolute difference value Dabs is multiplied by a predetermined motion sensitivity factor, a predetermined motion offset value is subtracted from the product, and the result is restricted to a predetermined range (e.g., from zero to a maximum quantity dM as described below). The resulting transformed difference signal Dm is sent to the isolated point remover 23 and the noise decision unit 30. This signal Dm includes both motion components and noise components that exceed the offset value.

Figure 2:
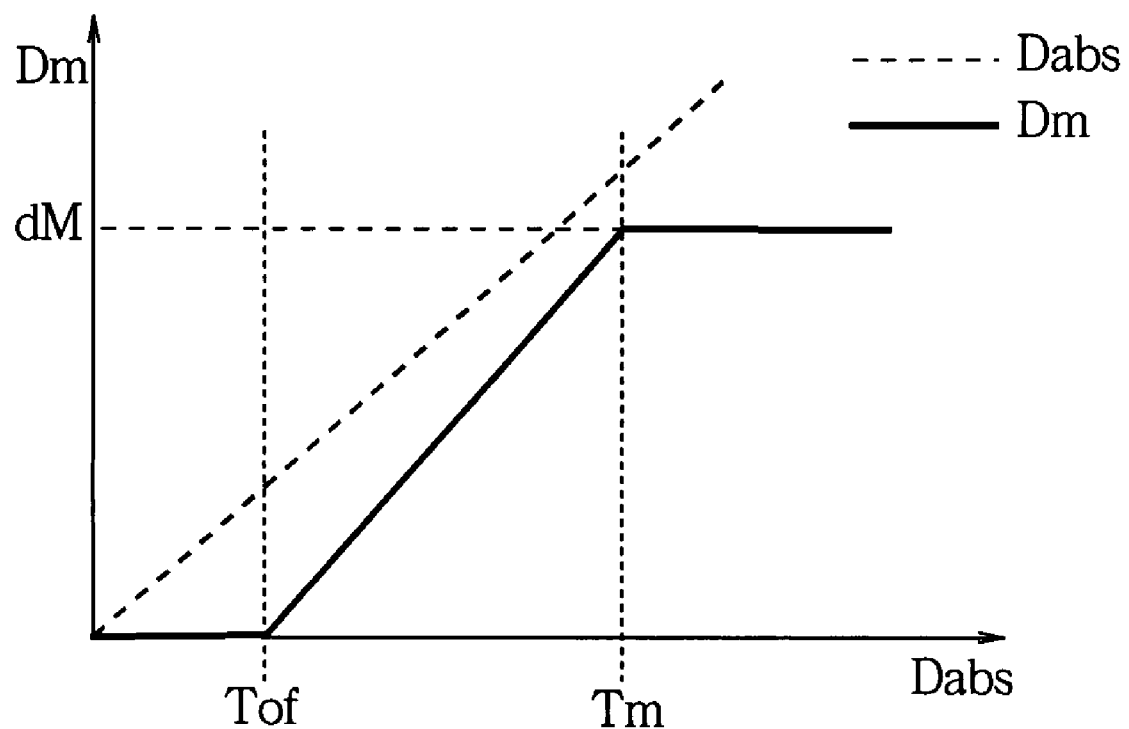
FIG. 2 is a graph of the input-output characteristic of the difference sensitivity converter in the motion detector in FIG. 1.

FIG. 2 shows a graph of the input-output characteristic of the difference sensitivity converter 22, illustrating the relationship between the absolute difference value Dabs (indicated on the horizontal axis as input) and the transformed difference signal Dm (indicated on the vertical axis as output). When the absolute difference value Dabs exceeds a certain value Tm, the transformed difference signal Dm is output with a maximum value dM indicating motion; when the absolute difference value Dabs is less than or equal to the motion offset value Tof, in which case Dabs does not indicate significant motion and is most likely due to low-level noise, the transformed difference signal Dm is equal to zero. The transformed difference signal Dm varies from zero to the maximum value dM to indicate increasing levels of motion or noise. The motion detection sensitivity can be adjusted by adjusting the size of the motion offset value Tof and the slope of the Dm locus between Tof and Tm. Increasing the slope (the motion sensitivity factor) makes motion easier to detect. Increasing the motion offset value increases the amount of the absolute difference Dabs that is treated as low-level noise perturbing a stationary pixel.

The isolated point remover 23 in the motion detector 20 receives the transformed difference signal Dm from the difference sensitivity converter 22, processes it by applying a majority rule, using the values of the transformed difference signal Dm at pixels in a predetermined area surrounding the pixel being processed (the pixel of interest), and modifies the transformed difference signal at the pixel of interest so as to remove isolated values. More specifically, the isolated point remover 23 corrects scatter in the values of the transformed difference signals at the surrounding pixels, decides whether the pixel of interest is moving or stationary, modifies the transformed difference signal Dm accordingly, and thereby generates the motion detection signal MDT.

Figure 3:
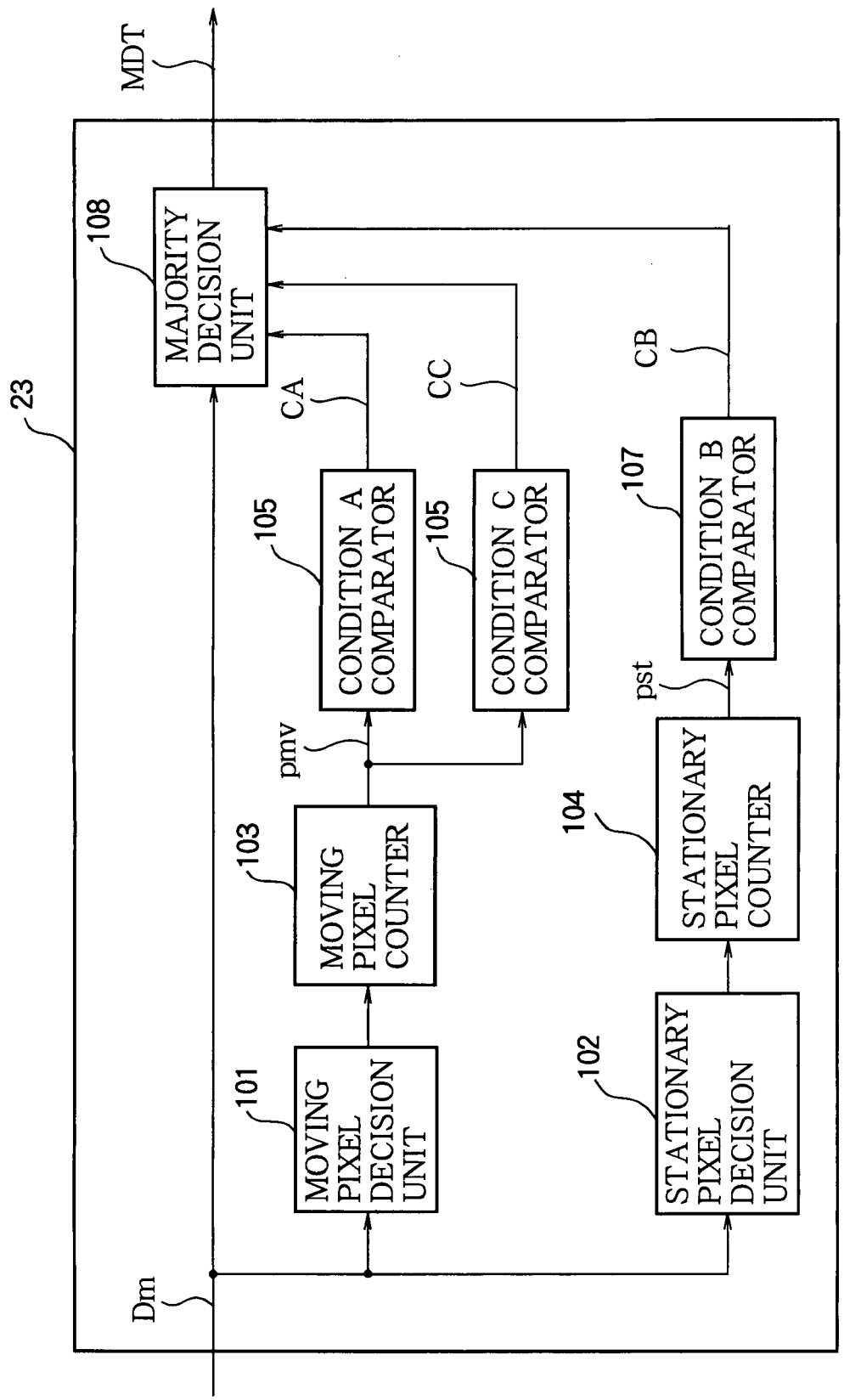
FIG. 3 is a block diagram showing an example of the structure of the isolated point remover in the motion detector in FIG. 1.

The isolated point remover 23 comprises a moving pixel decision unit 101, a stationary pixel decision unit 102, a moving pixel counter 103, a stationary pixel counter 104, a first comparator (condition A comparator) 105, a second comparator (condition C comparator) 106, a third comparator (condition B comparator) 107, and a majority decision unit 108, as illustrated by the block diagram in FIG. 3.

Figure 4:
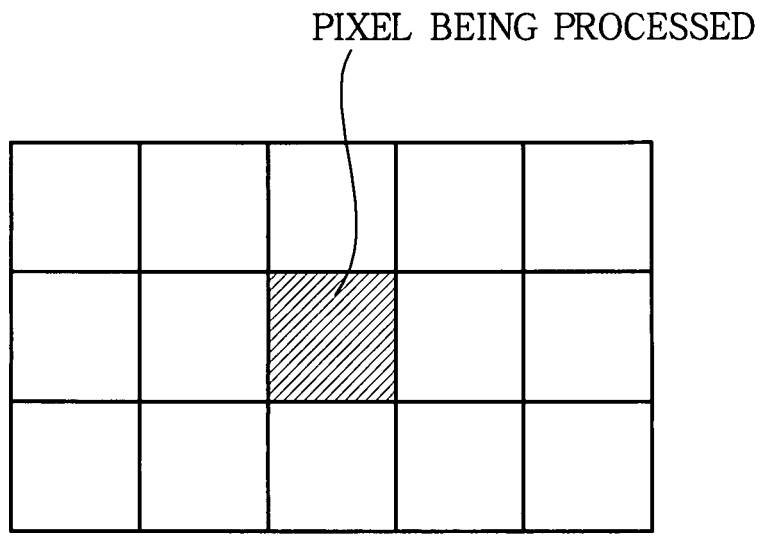
FIG. 4 is a diagram illustrating picture elements (pixels) involved in the majority rule process performed in the isolated point remover.

In the following description it will be assumed, as an example, that the area in which the isolated point remover 23 performs the majority rule decision process is a three-by-five rectangular fifteen-pixel area as shown in FIG. 4, in which the pixel being processed is the shaded pixel in the center. Any pixel area may be used, however: for example, the pixel area may be a one-by-five rectangular five-pixel area, the pixel being processed again being the pixel in the center.

Referring again to FIG. 3, the moving pixel decision unit 101 and the stationary pixel decision unit 102 in the isolated point remover 23 receive the transformed difference signal Dm from the difference sensitivity converter 22.

The moving pixel decision unit 101 compares the transformed difference signal Dm with a predetermined first threshold value to decide whether motion is present at each pixel, and outputs the result. Any type of signal with values indicating the result may be output. In the following description it will be assumed, as an example, that the result is a binary signal equal to '1', indicating a moving pixel, if the transformed difference signal Dm exceeds the first threshold, and equal to '0' otherwise.

The stationary pixel decision unit 102 compares the transformed difference signal Dm with a predetermined second threshold value to decide whether motion is absent at each pixel, and outputs the result. Any type of signal with values indicating the result may be output. In the following description it will be assumed, as an example, that the result is a binary signal equal to '1', indicating a stationary pixel, if the transformed difference signal Dm is less than the second threshold, and equal to '0' otherwise.

Instead of having a moving pixel decision unit 101 that decides whether motion is present and a stationary pixel decision unit 102 that decides whether motion is absent at each pixel, the isolated point remover 23 may have a single decision unit that compares the transformed difference signal Dm with a predetermined threshold value (corresponding to the first and second threshold values) to decide whether motion is present or absent at each pixel, and outputs a binary signal indicating a stationary pixel if the transformed difference signal Dm is less than the predetermined threshold, or a moving pixel if the transformed difference signal Dm exceeds the predetermined threshold. Since the isolated point remover 23 in FIG. 3 comprises both a moving pixel decision unit 101 and a stationary pixel decision unit 102, definitely moving pixels and definitely stationary pixels can be recognized, and other pixels, with Dm values between the first and second threshold values, can be treated as neither definitely moving nor definitely stationary.

The moving pixel counter 103 in the isolated point remover 23 receives the binary signal indicating moving pixels from the moving pixel decision unit 101, and processes each pixel by counting the number of moving pixels in an area around the pixel. For example, the moving pixel counter 103 may count the number of moving pixels in a three-by-five rectangular fifteen-pixel area as shown in FIG. 4, in which the pixel being processed is the shaded pixel in the center. For each pixel, the result is output as a moving pixel count pmv.

The stationary pixel counter 104 in the isolated point remover 23 receives the binary signal indicating stationary pixels from the stationary pixel decision unit 102, and processes each pixel by counting the number of stationary pixels in an area around the pixel. For example, the stationary pixel counter 104 may count the number of stationary pixels in the three-by-five rectangular fifteen-pixel area shown in FIG. 4. For each pixel, the result is output as a stationary pixel count pst.

The moving pixel counter 103 in the isolated point remover 23 outputs the moving pixel count pmv to the condition A comparator 105 and condition C comparator 106; the stationary pixel counter 104 in the isolated point remover 23 outputs the stationary pixel count pst to the condition B comparator 106. In these comparators, the moving pixel count pmv and stationary pixel count pst are compared with predetermined thresholds to remove isolated values.

The condition A comparator 105 in the isolated point remover 23 compares the moving pixel count pmv with a threshold thA and outputs a signal CA indicating the result. In the following description it will be assumed as an example that CA takes the value '1', indicating that the surrounding area is in motion, when the moving pixel count pmv exceeds the threshold value thA, and otherwise takes the value '0', indicating that the surrounding area is substantially stationary. If the threshold thA is equal to four (thA=4), for example, then the area is considered to be in motion (CA=1) when at least five of its fifteen pixels are moving (pmv≧5).

The condition C comparator 106 in the isolated point remover 23 compares the moving pixel count pmv with a threshold thC and outputs a signal CC indicating the result. In the following description it will be assumed as an example that CC takes the value '1', indicating that the surrounding area is stationary, when the moving pixel count pmv is less than the threshold value thC, and otherwise takes the value '0', indicating that the surrounding area is in motion or substantially in motion. If the threshold thC is equal to seven (thC=7), for example, then the area is considered to be stationary (CC=1) when no more than six of its fifteen pixels are moving (pmv≦6). The threshold value thC may be identical to the threshold value thA in the condition A comparator 105.

The condition B comparator 106 in the isolated point remover 23 compares the stationary pixel count pst with a threshold thB and outputs a signal CB indicating the result. In the following description it will be assumed as an example that CB takes the value '1', indicating that the surrounding area is stationary, when the stationary pixel count pst exceeds the threshold value thB, and otherwise takes the value '0', indicating that the surrounding area is in motion or substantially in motion. If the threshold thB is equal to ten (thB=10), for example, then the area is considered to be stationary (CB=1) when at least eleven of its fifteen pixels are stationary (pst≧11).

The majority decision unit 108 receives the comparison result signals CA, CC, and CB from the condition A comparator 105, condition C comparator 106, and condition B comparator 106 and applies a majority rule to remove isolated points.

Figure 5:
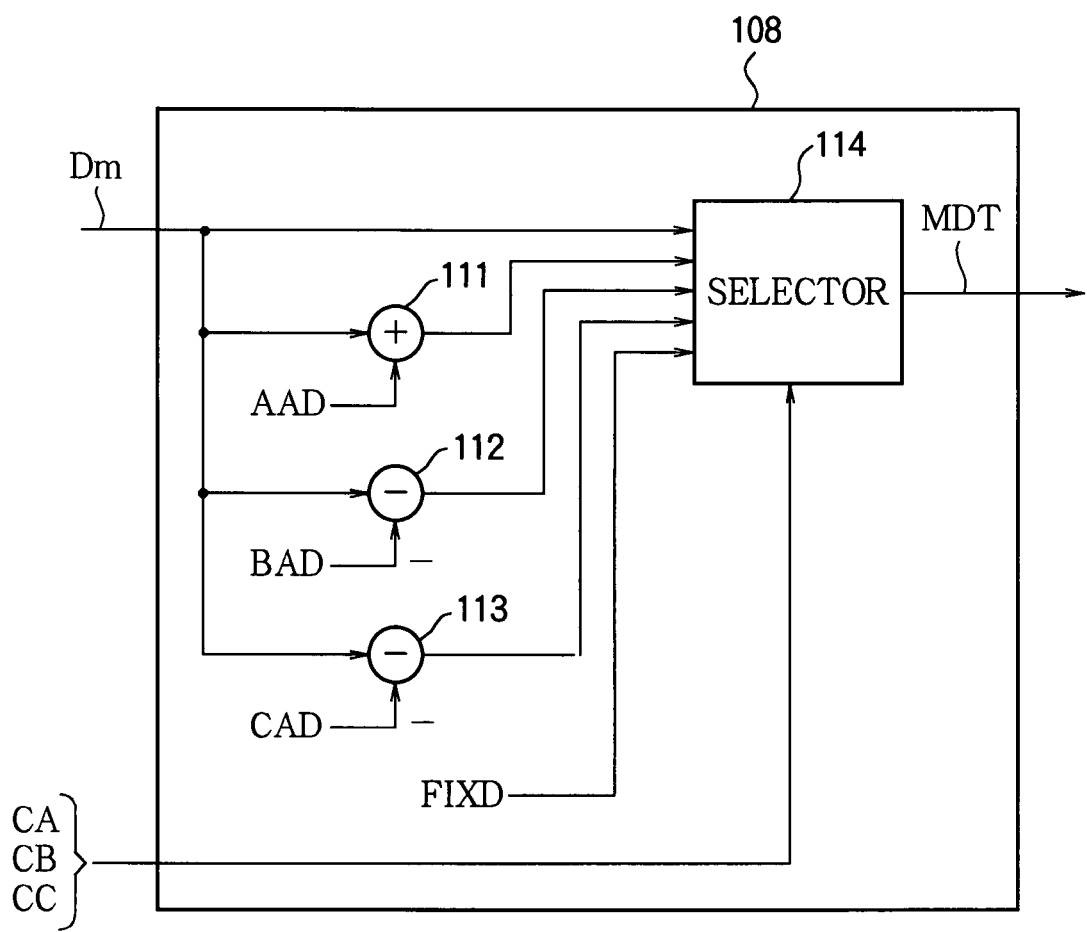
FIGS. 5 and 6 are block diagrams showing examples of the structure of the majority decision unit in FIG. 3.

More specifically, the majority decision unit 108 processes the transformed difference signal Dm, which it receives from the difference sensitivity converter 22, by applying a majority rule to decide whether each pixel is in a moving or stationary area, and modifies the transformed difference signal Dm by letting it be swayed by the moving or stationary state of the surrounding area. This has the effect of reducing scatter in the results indicated by the comparison result signals CA, CC, and CB. In this way, the majority decision unit 108 removes isolated noise and generates the motion detection signal MDT. The majority decision unit 108 comprises a condition A adder 111, a condition B adder 112, a condition C adder 113, and a selector 114, as illustrated in FIG. 5.

The condition A adder 111, condition B adder 112, and condition C adder 113 in the majority decision unit 108 receive and modify the transformed difference signal Dm by adding or subtracting predetermined corrective values AAD, BAD, and CAD.

The condition A adder 111 in the majority decision unit 108 receives the transformed difference signal Dm, adds the corrective value AAD, and sends the result (Dm+AAD) to the selector 114. Adding the corrective value AAD increases the value of the transformed difference signal Dm, altering it in the direction that indicates motion.

The condition B adder 112 in the majority decision unit 108 receives the transformed difference signal Dm, subtracts the corrective value BAD from it, and sends the result (Dm−BAD) to the selector 114. Subtracting the corrective value BAD brings the transformed difference signal Dm closer to zero, which is the state of a stationary pixel. If the subtraction result is negative (Dm−BAD<0), it may be clipped to zero for output to the selector 114.

The condition C adder 113 in the majority decision unit 108 receives the transformed difference signal Dm, subtracts the corrective value CAD from it, and sends the result (Dm−CAD) to the selector 114. Subtracting the corrective value CAD brings the transformed difference signal Dm closer to the stationary pixel state (zero). If the subtraction result is negative (Dm−CAD<0), it may be clipped to zero for output to the selector 114.

The selector 114 in the majority decision unit 108 receives the transformed difference signal Dm from the difference sensitivity converter 22, the result (Dm+AAD) from the condition A adder 111, the result (Dm−BAD) from the condition B adder 112, the result (Dm−CAD) from the condition C adder 113, a fixed value FIXD, and the results of comparisons A, C, and B. The selector 114 selects one of the transformed difference signal Dm, the upwardly adjusted condition A result (Dm+AAD), the downwardly adjusted condition B result (Dm−BAD), the downwardly adjusted condition C result (Dm−CAD), and the fixed value FIXD according to the results of comparisons A, C, and B by applying a majority rule as described below, and thereby generates the motion detection signal MDT, from which isolated noise has been removed.

If the result of comparison A is '1' (CA=1), indicating that the surrounding area is in motion, the corresponding sum is selected and output (MDT=Dm+AAD), altering the transformed difference signal Dm upwardly to indicate greater motion.

If the result of comparison B is '1' (CB=1), indicating that the surrounding area is stationary, the corresponding difference is selected and output (MDT=Dm−BAD), altering the transformed difference signal Dm downwardly to indicate less motion.

If the result of comparison C is '1' (CC=1), indicating that the surrounding area is stationary, the corresponding difference is selected and output (MDT=Dm−CAD), altering the transformed difference signal Dm downwardly to indicate less motion.

If the results of comparison A and B are both '1' (CA=1 and CB=1), the fixed value is selected and output (MDT=FIXD) as an intermediate value. This is the case in which whether the surrounding area is in motion or stationary cannot be decided from the values of the transformed difference signal Dm.

If the results of comparisons A, B, and C are all '0', the transformed difference signal Dm is selected and output (MDT=Dm).

Figure 6:
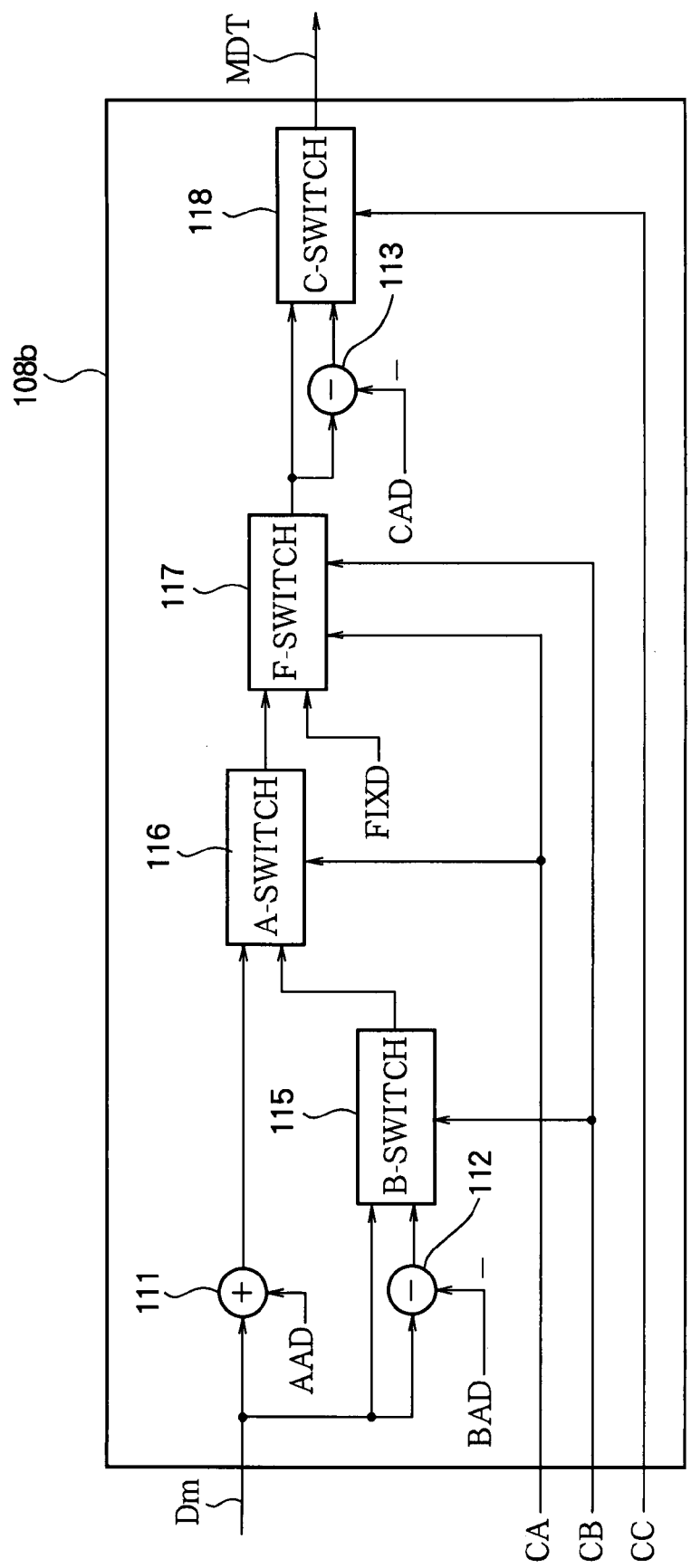

Instead of using the majority decision unit 108 in FIG. 5, the isolated point remover 23 may use the majority decision unit 108b in FIG. 6. The majority decision unit 108b in FIG. 6 differs from the majority decision unit 108 in FIG. 5 by including a B-switch 115, an A-switch 116, an F-switch 117, and a C-switch 118 instead of the selector 114 described above. The same majority rule applies: the B-switch 115 switches between the transformed difference signal Dm and the result (Dm−BAD) according to the result of comparison B; the A-switch 116 switches between the signal output from the B-switch 115 and the result (Dm+AAD) according to the result of comparison A; the F-switch 117 switches between the fixed value FIXD and the signal output from the A-switch 116 according to the results of comparisons A and B; and the C-switch 118 switches between the signal output from the F-switch 117 and the result (Dm−CAD) according to the result of comparison C, and generates the motion detection signal MDT from which isolated noise has been removed. Each of the B-switch 115, A-switch 116, F-switch 117, and C-switch 118 thus performs part of the operation performed by the selector 114 in FIG. 5. A more detailed description will be omitted.

In the majority decision unit 108b, since the B-switch 115, the A-switch 116, the F-switch 117, and the C-switch 118 are cascaded, the results of comparisons A, B, and C are prioritized.

Majority rule schemes other the ones illustrated in FIGS. 5 and 6 may also be used to remove isolated noise. For example, the transformed difference signal Dm may be altered according only to the results of comparisons A and B so that the motion detection signal MDT has the same value as the transformed difference signal Dm in the surrounding area, or the transformed difference signal Dm may be altered by adding a corrective value according only to the result of comparison A, or altered by subtracting a corrective value according only to the result of comparison B.

As described above, the isolated point remover 23 in the motion detector 20 processes the transformed difference signal Dm from the difference sensitivity converter 22 by applying a majority rule, using the values of the transformed difference signal Dm at pixels in a predetermined area surrounding the pixel being processed, so as to remove isolated values and detect motion that was not indicated by the transformed difference signal Dm itself, and sends the resulting motion detection signal MDT to the subtractor 24 in the motion level calculator 19. The motion detection signal MDT is essentially a difference signal that has been modified to stress non-isolated motion. Comparatively large values of the motion detection signal MDT generally indicate moving pixels; smaller values may indication motion, noise, or a combination of both.

Next, the structure of the noise decision unit 30 in the motion and noise detector 14 will be described. Referring again to FIG. 1, the noise decision unit 30 receives the transformed difference signal Dm from the difference sensitivity converter 22 in the motion detector 20. As explained above, the transformed difference signal Dm has been obtained by a nonlinear transformation of the absolute value signals Dabs. The noise decision unit 30 detects comparatively large noise components included in the transformed difference signal Dm, and generates the noise detection signal NDT indicating the noise level.

The transformed difference signal Dm obtained from the absolute value Dabs of the frame difference signal Diff includes both motion and noise components. As described above, to generate the motion detection signal MDT, the isolated point remover 23 in the motion detector 20 processes the transformed difference signal Dm so as to remove isolated values and detect motion that was not indicated by the transformed difference signal Dm itself, but in this process, variations in the values of the transformed difference signals at the surrounding pixels may make noise in the transformed difference signal Dm appear to be motion, and the isolated point remover 23 may mistake the noise for motion. The noise decision unit 30 therefore detects noise components included in the transformed difference signal Dm by detecting a high-frequency component of the transformed difference signal Dm.

The bandpass filter 31 in the noise decision unit 30 receives the transformed difference signal Dm from the difference sensitivity converter 22 in the motion detector 20. The bandpass filter 31 extracts a high-frequency component of the transformed difference signal Dm. The high-frequency component is a noise component. In the following description it will be assumed, as an example, that the bandpass filter 31 operates on a square nine-pixel area as shown in FIG. 7A, in which the pixel being processed is the shaded pixel in the center. Any pixel area may be used, however: for example, the pixel area may be a three-pixel horizontal area centered on the pixel being processed, as shown in FIG. 7B. The numerical values in FIGS. 7A and 7B are filter coefficients applied to the pixels; the filter takes the sum of the resulting products.

The absolute value calculator 32 in the noise decision unit 30 receives the output from the bandpass filter 31. The absolute value calculator 32 takes the absolute value of the high-frequency component at each pixel and outputs the absolute value as an absolute noise signal Nabs.

The averaging unit 33 in the noise decision unit 30 receives the absolute noise signal Nabs from the absolute value calculator 32. The averaging unit 33 obtains an averaged noise signal Nave by taking the mean value of the absolute noise signal Nabs in a vicinity of each pixel. The purpose of this is to prevent artifacts at locations where the absolute noise signal Nabs is likely to change abruptly, as at moving edges. In the following description it will be assumed, as an example, that the averaging unit 33 takes the mean value of the absolute noise signal Nabs at five consecutive pixels constituting a one-by-five rectangular area. Any pixel area may be used, however: for example, the pixel area may be a one-by-three pixel area, or a one-by-seven pixel area.

The noise decision sensitivity converter 34 receives the averaged noise signal Nave from the averaging unit 33 and transforms it by a nonlinear process in which, for example, the averaged noise signal Nave is multiplied by a predetermined noise sensitivity factor, a predetermined noise offset value is subtracted from the product, and the result is restricted to a predetermined range. The resulting noise detection signal NDT is sent to the subtractor 24 in the motion level calculator 19. The averaged noise signal Nave is a noise component extracted from the transformed difference signal Dm. The greater the value of the averaged noise signal Nave is, the greater the likelihood that the transformed difference signal Dm is itself a noise component becomes. Increasing the slope (the noise sensitivity factor) thus increases the tendency of the noise detection signal to indicate the presence of noise in the transformed difference signal Dm.

The noise decision sensitivity converter 34 processes the averaged noise signal Nave nonlinearly, generates the noise detection signal NDT, and outputs the generated noise detection signal NDT to the subtractor 24 in the motion level calculator 19. The noise detection signal NDT indicates the level of comparatively large noise components included in the frame difference.

Referring once more to FIG. 1, the motion level calculator 19 in the motion and noise detector 14 receives the motion detection signal MDT from the motion detector 20 and the noise detection signal NDT from the noise decision unit 30. The motion level calculator 19 subtracts the noise detection signal NDT from the motion detection signal MDT and performs other processing, described below, to generate the motion level signal MDS indicating the level of motion in the frame difference.

The subtractor 24 in the motion level calculator 19 receives the motion detection signal MDT from the motion detector 20 and the noise detection signal NDT from the noise decision unit 30. The subtractor 24 subtracts the noise detection signal NDT from the motion detection signal MDT to generate a motion signal MSG.

The frame difference signal Diff includes motion and noise components in the video signal. If noise is mistakenly detected as motion, much of the mistaken part of the motion detection signal MDT is removed when the noise detection signal NDT is subtracted. The part that is left is more easily recognizable as indicating a stationary pixel disturbed by noise, rather than a moving pixel. In this way motion can be distinguished from noise components in the frame difference.

The low-pass filter 25 in the motion level calculator 19 receives the motion signal MSG from the subtractor 24. The low-pass filter 25 filters the motion signal MSG horizontally, or horizontally and vertically, to obtain a spatially broadened signal for output to the motion level converter 26.

The motion level converter 26 in the motion level calculator 19 receives the output from the low-pass filter 25, generates the motion level signal MDS by operations such as multiplication and amplitude limiting, and outputs the generated motion level signal MDS.

More specifically, the motion level converter 26 sets the motion level signal MDS to a predetermined positive highest integer value MD1 if the spatially broadened signal from the low-pass filter 25 exceeds a predetermined value and the frame difference Diff appears to be completely due to motion, to zero if the spatially broadened signal is equal to or less than zero and motion appears to be absent, either because the frame difference is zero or because the frame difference is due completely to noise, and to intermediate integer values to indicate intermediate levels of motion. The motion scale accordingly has (MD1+1) levels from zero to MD1. It will be assumed, as an example, that the highest level is eight (MDS=8), so the scale has nine levels ranging from zero (MDS=0), indicating a completely stationary pixel, to eight (MDS=8), indicating a definitely moving pixel. Although the scale described above has nine levels, this is not a restriction; the scale may have any number of levels. The spatially broadened signal from the low-pass filter 25 may be multiplied by a predetermined value and the amplitude of the resulting signal may be limited to the range from zero to eight to obtain the motion level signal MDS.

The motion level signal MDS is sent from the motion level converter 26 in the motion level calculator 19 to the coefficient calculation unit 16.

The coefficient calculation unit 16 receives the motion level signal MDS from the motion level calculator 19 in the motion and noise detector 14 and obtains the recursion coefficient Km, which varies with respect to the motion level signal MDS. The coefficient calculation unit 16 varies the recursion coefficient Km between zero and unity so that as the motion level signal MDS increases up to a certain value, the recursion coefficient Km decreases to zero, and when the motion level signal MDS exceeds the certain value, the recursion coefficient Km is equal to zero. Accordingly, when the motion level signal MDS definitely indicates motion (MDS=8), the recursion coefficient Km is zero (Km=0), and when the motion level signal MDS definitely indicates the absence of motion (MDS=0), either because the frame difference is zero or because the frame difference is due completely to noise, the recursion coefficient Km has a maximum value Kmax (Kmax≦1). In all cases, 0≦Km≦1.

The coefficient calculation unit 16 comprises a coefficient calculator 201, a slope setter 202, a coefficient limiter 203, and a maximum coefficient setter 204, as illustrated by the block diagram in FIG. 8.

The coefficient calculator 201 in the coefficient calculation unit 16 receives the motion level signal MDS from the motion and noise detector 14 and a slope value Ef from the slope setter 202. The coefficient calculator 201 calculates a preliminary value pkm by subtracting the motion level signal MDS from its maximum value and multiplying the result by the slope Ef. If the motion scale has levels from zero (MDS=0) to eight (MDS=8) as described above, then the preliminary value pkm is obtained as pkm=(8−MDS)×Ef, so that 0≦pkm≦8×Ef. Although the preliminary value pkm can be obtained by actual multiplication as described above, the coefficient calculator 201 may be a read-only memory (ROM), for example, and the preliminary value pkm may be generated by using the slope Ef and the value of the motion level signal MDS as an address.

The slope setter 202 in the coefficient calculation unit 16 sets the slope (multiplier) Ef for the process in which the coefficient calculator 201 calculates the preliminary value pkm from the motion level signal MDS. The slope Ef determines the amount by which the recursion coefficient Km varies according to variations in the motion level signal MDS.

The preliminary value pkm calculated by the coefficient calculator 201 is output to the coefficient limiter 203.

The coefficient limiter 203 in the coefficient calculation unit 16 receives the preliminary value pkm from the coefficient calculator 201 and the maximum recursion coefficient value Kmax (0<Kmax≦1) from the maximum coefficient setter 204. The coefficient limiter 203 limits the preliminary value pkm from the coefficient calculator 201 according to the recursion coefficient maximum value Kmax, and outputs the recursion coefficient Km. The recursion coefficient Km is accordingly equal to or greater than zero and equal to or less than the recursion coefficient maximum value Kmax.

The maximum coefficient setter 204 in the coefficient calculation unit 16 sets the maximum value Kmax of the recursion coefficient Km. The recursion coefficient Km output from the coefficient limiter 203 is limited to values equal to or less than the maximum value Kmax. Whereas the recursion coefficient Km determines the value of the noise recursion quantity Nd when noise is reduced, the maximum value Kmax can be used to adjust the strength of the noise reduction effect.

Although the coefficient calculation unit 16 shown in FIG. 1 operates by calculating the preliminary value pkm from the motion level signal MDS and then limiting the preliminary value pkm, the coefficient calculation unit 16 may be a ROM that uses the motion level signal MDS as an address to obtain the recursion coefficient Km directly, with the same results as described above. Alternatively, the motion level signal MDS, the slope Ef with which the recursion coefficient Km varies with respect to the motion level signal MDS, and the recursion coefficient maximum value Kmax may be used as address inputs.

Figure 9:
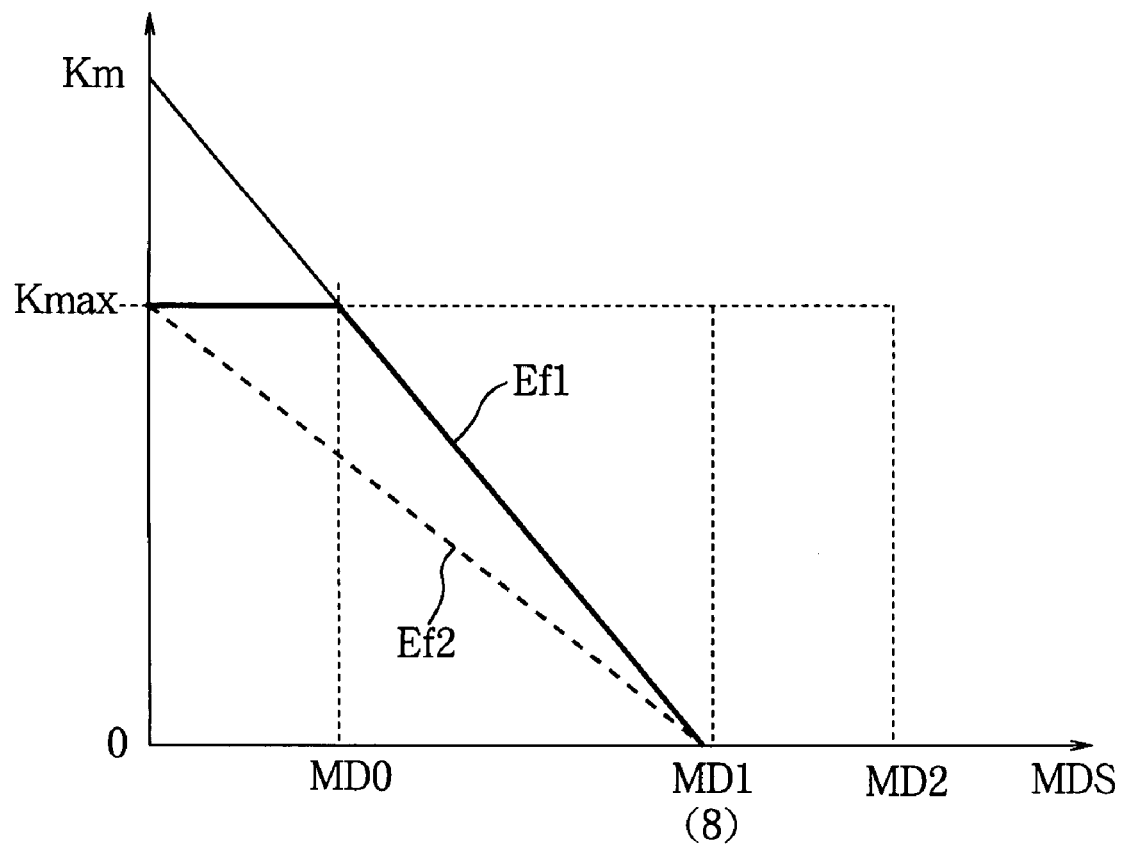
FIG. 9 is a graph of the input-output characteristic of the coefficient calculation unit in FIG. 1.

FIG. 9 shows a graph of the input-output characteristic of the coefficient calculation unit 16, illustrating the relationship between the motion level signal MDS (indicated on the horizontal axis as input) and the recursion coefficient Km (indicated on the vertical axis as output). Ef1 and Ef2 are two possible slope values that might be set by the motion detector 20. The solid line is the characteristic defined by the maximum value Kmax and slope Ef1; the dashed line is the characteristic defined by Kmax and Ef2. In both cases, the recursion coefficient Km has its maximum value Kmax (Kmax≦1) when the motion level signal MDS is equal to or less than a first predetermined value (zero or MD0), and decreases from the maximum value Kmax to zero as the motion level signal MDS increases from the first predetermined value (zero or MD0) to a second predetermined value MD1 (e.g., MDS=8) that definitely indicates motion. The first predetermined value, which indicates absence of motion, varies depending on the maximum value Kmax and slope (EF1 or Ef2).

The recursion coefficient Km that is limited by the coefficient limiter 203 in the coefficient calculation unit 16 to the maximum value Kmax is output to the multiplier 17 in FIG. 1.

The multiplier 17 receives the limited frame difference Dfn from the amplitude limiter 13 and the recursion coefficient Km from the coefficient calculation unit 16. The multiplier 17 multiplies the limited frame difference Dfn by the recursion coefficient Km to obtain the noise recursion quantity Nd (Nd=Km×Dfn). The noise recursion quantity Nd is output to the adder 18.

Since the recursion coefficient Km is calculated in this way from the motion level signal MDS, the recursion coefficient Km and hence the noise recursion quantity Nd are equal to zero (Nd=0) in parts of the image in which the motion level signal MDS definitely indicates motion. Conversely, in parts of the image where the frame difference Diff appears to be due entirely to noise, the recursion coefficient Km has its maximum value Kmax, providing maximum removal of noise. In other parts of the image, the recursion coefficient varies between these extremes according to the detected motion level.

The adder 18 adds the noise recursion quantity Nd received from the multiplier 17 to the input signal Di0, combining the input signal Di0 and the delayed video signal Im1 output for the preceding frame in generally a ratio of (1−Km):Km. The noise recursion quantity Nd may be negative. This operation produces the noise-reduced output signal Di0 for the current frame.

Next, the operations of processing the frame difference, detecting motion and noise in the video signal, obtaining the motion level signal MDS indicating the motion level in the frame difference, and setting the recursion coefficient Km according to the motion level signal MDS to reduce noise in the noise reducer 1 according to the first embodiment will be described more specifically.

The operations will be described in sequence with reference to the flowchart in FIG. 10.

In step S1, the subtractor 12 receives the current frame signal Di0 input to the noise reducer 1 and the video signal Im1 of the preceding frame obtained by the frame memory 11 by delaying the noise-reduced video signal DoO by one frame, and takes the difference between these signals Di0 and Im1 to obtain the frame difference signal Diff. The amplitude limiter 13 limits the amplitude of the frame difference signal Diff to a predetermined range, and outputs the limited frame difference Dfn as a possible noise component.

In step S2, the absolute value calculator 21 in the motion detector 20 in the motion and noise detector 14 receives the frame difference signal Diff, and takes its absolute value Dabs. The difference sensitivity converter 22 transforms the absolute value Dabs nonlinearly to obtain the transformed difference signal Dm, and sends the transformed difference signal Dm to the isolated point remover 23 in the motion detector 20 and to the noise decision unit 30. This signal Dm includes both motion components and comparatively large noise components.

In step S3, the isolated point remover 23 in the motion detector 20 processes the transformed difference signal Dm by applying a majority rule, using the values of the transformed difference signal Dm at pixels in an area surrounding the pixel being processed (the pixel of interest), corrects scatter in the values of the transformed difference signals at the surrounding pixels, decides whether the pixel of interest is moving or stationary, modifies the transformed difference signal Dm accordingly, and thereby generates the motion detection signal MDT. The motion detection signal MDT, which indicates the motion level, is sent to the subtractor 24 in the motion level calculator 19.

In step S4, the bandpass filter 31 in the noise decision unit 30 receives the transformed difference signal Dm from the difference sensitivity converter 22 in the motion detector 20. The bandpass filter 31 extracts a high-frequency component of the transformed difference signal Dm. The high-frequency component is a noise component. The absolute value calculator 32 takes the absolute value of the high-frequency component at each pixel to obtain the absolute noise signal Nabs.

In step S5, the averaging unit 33 in the noise decision unit 30 receives the absolute noise signal Nabs from the absolute value calculator 32, and obtains the averaged noise signal Nave by taking the mean value of the absolute noise signal Nabs in a vicinity of each pixel. The noise decision sensitivity converter 34 receives the averaged noise signal Nave, processes the averaged noise signal Nave nonlinearly, and generates the noise detection signal NDT. The noise detection signal NDT indicates the level of comparatively large noise components included in the frame difference.

The transformed difference signal Dm includes both motion and noise components. As described above, to generate the motion detection signal MDT, the isolated point remover 23 in the motion detector 20 processes the transformed difference signal Dm so as to remove isolated values and detect motion that was not indicated by the transformed difference signal Dm itself. Since the isolated point remover 23 may also detect noise as motion, the noise decision unit 30 detects noise components included in the transformed difference signal Dm by detecting a high-frequency component of the transformed difference signal Dm, and decides whether the frame difference is due to noise. In this way motion can be distinguished from noise components in the frame difference.

In step S6, the subtractor 24 in the motion level calculator 19 receives the motion detection signal MDT and the noise detection signal NDT, and subtracts the noise detection signal NDT from the motion detection signal MDT to generate a motion signal MSG. If noise is mistakenly detected as motion, its level is reduced when the noise detection signal NDT is subtracted, so that what is left more closely indicates a stationary pixel. Noise components in the frame difference can therefore be distinguished by their low level.

In step S7, the low-pass filter 25 receives the motion signal MSG from the subtractor 24, and filters the motion signal MSG to obtain a spatially broadened signal for output to the motion level converter 26. The motion level converter 26 receives the output from the low-pass filter 25, and generates the motion level signal MDS. More specifically, the motion level converter 26 sets the motion level signal MDS to a predetermined positive highest integer value MD1 such as eight if the spatially broadened signal from the low-pass filter 25 exceeds a predetermined value and the frame difference Diff appears to be completely due to motion, to zero if the spatially broadened signal is equal to or less than zero, indicating that any frame difference that may be present is due to noise, and to intermediate values to indicate levels of motion between these states. The motion detection signal MDS accordingly varies from zero to, for example, eight to indicate different degrees of motion.

The motion level signal MDS is sent from the motion level converter 26 in the motion and noise detector 14 to the coefficient calculation unit 16.

In step S8, the coefficient calculation unit 16 derives the recursion coefficient Km from the motion level signal MDS. As can be seen from the characteristic curve defined by the maximum value Kmax and slope Ef shown in FIG. 9, for example, the recursion coefficient Km takes its maximum value Kmax (Kmax≦1) when the level of motion is equal to or less than a predetermined value MD0, and then decreases to zero as the motion level increases from MD0 to the maximum value MD1 (e.g., eight). The recursion coefficient Km, which determines the amount of noise reduction, thus varies, depending on the level of motion detected in the frame difference signal after noise removal.

In step S9, the multiplier 17, which receives the recursion coefficient Km from the coefficient calculation unit 16, multiplies the limited frame difference Dfn from the amplitude limiter 13 by the recursion coefficient Km to obtain the noise recursion quantity Nd (Nd=Km×Dfn). The noise recursion quantity Nd is output to the adder 18.

In step S10, the adder 18 algebraically adds the noise recursion quantity Nd received from the multiplier 17 to the input signal Di0. The noise recursion quantity Nd may be positive or negative; in either case, the addition operation reduces the noise component. In step S11, the noise-reduced output signal Di0 is output for the current frame.

Since the recursion coefficient Km is calculated as described above from the motion level signal MDS, the recursion coefficient Km is equal to zero in parts of the image in which the motion level signal MDS definitely indicates motion (MDS=8). Accordingly, in definitely moving parts of the image, the noise recursion quantity Nd is equal to zero, noise reduction is not performed, and motion artifacts due to noise reduction are eliminated. At lower MDS values, motion artifacts are reduced. At and near the minimum detected motion level (MDS=0), where the entire frame difference can be ascribed to noise, the recursion coefficient Km has its maximum value Kmax, providing maximum removal of the noise.

As described above, in the noise reducer 1 according to the first embodiment, the motion detector 20 transforms the frame difference signal Diff obtained in the subtractor 12 to obtain the transformed difference signal Dm and processes the transformed difference signal Dm to obtain the motion detection signal MDT, while the noise decision unit 30 extracts a noise component from the transformed difference signal Dm to obtain the noise detection signal NDT. The motion level signal MDS is obtained from the motion detection signal MDT and the noise detection signal NDT, and the recursion coefficient Km is obtained according to the motion level signal MDS to reduce noise in the video signal. Accordingly, even if the video signal includes noise components with large values, these large noise components can be distinguished from motion in the frame difference so that they do not reduce the recursion coefficient unnecessarily. In stationary parts of the image, even if considerable noise is present, the recursion coefficient Km has its maximum value Kmax, providing maximum removal of the noise. In moving parts of the image, the recursion coefficient Km is reduced, reducing motion artifacts, regardless of the presence or absence of noise.

Figure 11:
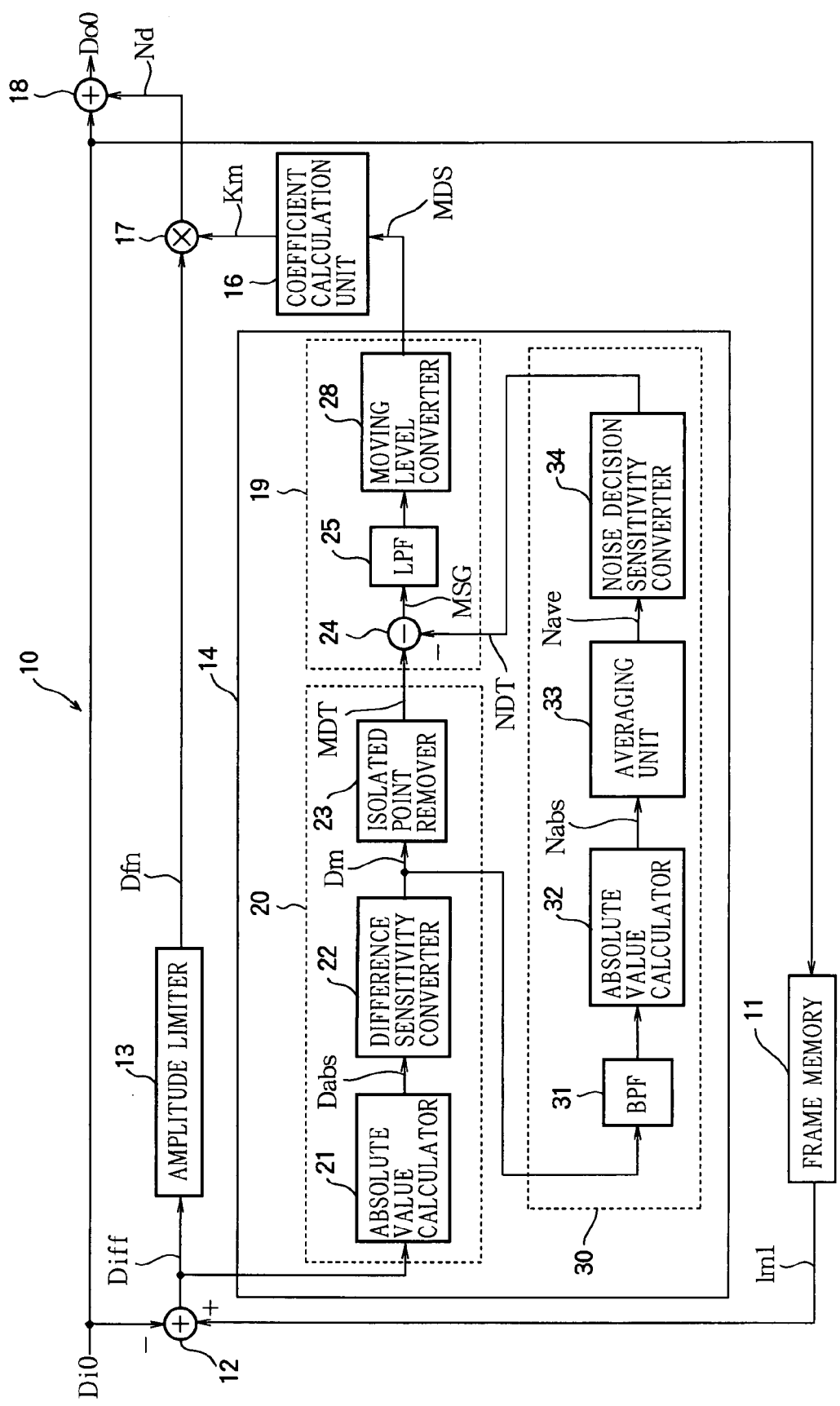
FIG. 11 is a block diagram illustrating the structure of a non-recursive noise reducer according to the first embodiment.

In a variation of the first embodiment, instead of delaying the noise-reduced video signal DoO output for the preceding frame, the frame memory 11 delays the input video signal Di0 by one frame as shown in FIG. 11. The frame difference signal Diff is then simply the difference between the input video signal in the current frame and the input video signal in the preceding frame. This type of noise reducer is referred to as a nonrecursive noise reducer, meaning that in correlating the video signals in the current and preceding frames, it ignores noise reduction that took place in preceding frames. In other respects, the nonrecursive noise reducer 10 in FIG. 11 and the noise reducer 1 in FIG. 1 operate in the same way, so a detailed description will be omitted.

A frame recursive noise reducer such as the noise reducer 1 in FIG. 1 is said to be recursive because in obtaining the frame-to-frame difference, it takes its own operation in previous frames into account. As a result, the noise reducer 1 in FIG. 1 has a greater noise reduction effect than the nonrecursive noise reducer 10 in FIG. 11, but the nonrecursive noise reducer 10 prevents artifacts more effectively than the noise reducer 1 when the video signal includes large amounts of motion.

Although the frame memory 11 delays the video signal by one frame as described above, the input video signal may be either an interlaced signal or a progressive signal. If an interlaced signal is input, the frame memory 11 delays the interlaced signal by two fields, and if a progressive signal is input, the frame memory 11 delays the progressive signal by one frame.

The relationship between the motion level signal MDS and the recursion coefficient Km is not restricted to the type of relationship described above. For example, the maximum motion level may be a level MD2 higher than the level MD1 in FIG. 9. The coefficient calculation unit 16 then gives the recursion coefficient Km its maximum value for motion levels up to MD0, reduces the recursion coefficient Km to zero as the motion level increases from MD0 to MD1, and holds the recursion coefficient Km at zero as the motion level increases from MD1 to MD2, as shown by the extended solid line in FIG. 9.

Although the constituents of the noise reducer 1 were described above as hardware, the first embodiment may be realized by program control in software.

Second Embodiment

In the first embodiment, the noise decision unit 30 generates the noise detection signal NDT from the transformed difference signal Dm obtained from the difference sensitivity converter 22 in the motion detector 20 in the motion and noise detector 14, which has been obtained by a nonlinear transformation of the absolute value signals Dabs. The noise detection signal NDT may also be derived, however, directly from the frame difference signal Diff output by the subtractor 12.

Figure 12:
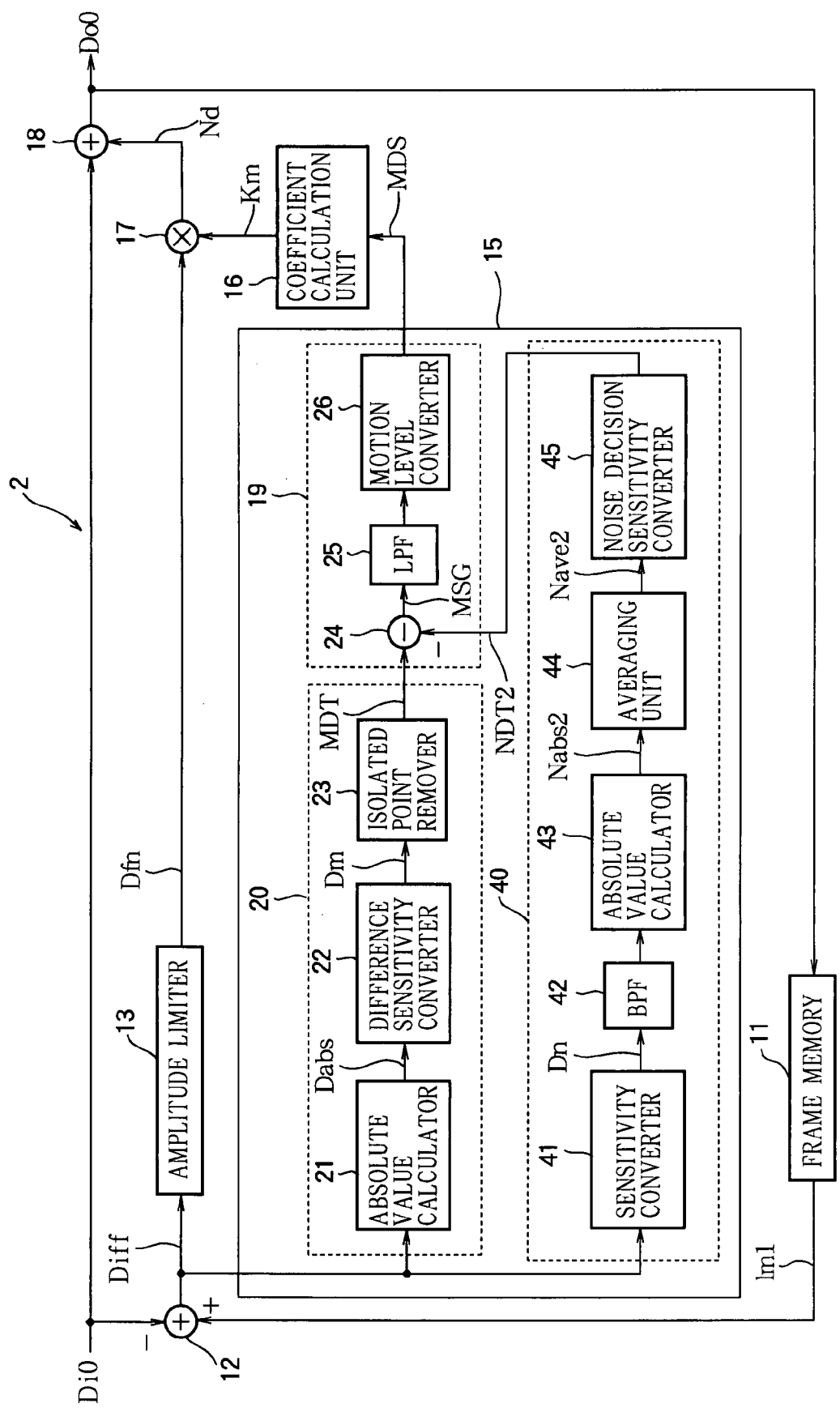
FIG. 12 is a block diagram showing an example of the structure of a noise reducer according to a second embodiment.
Figure 13:
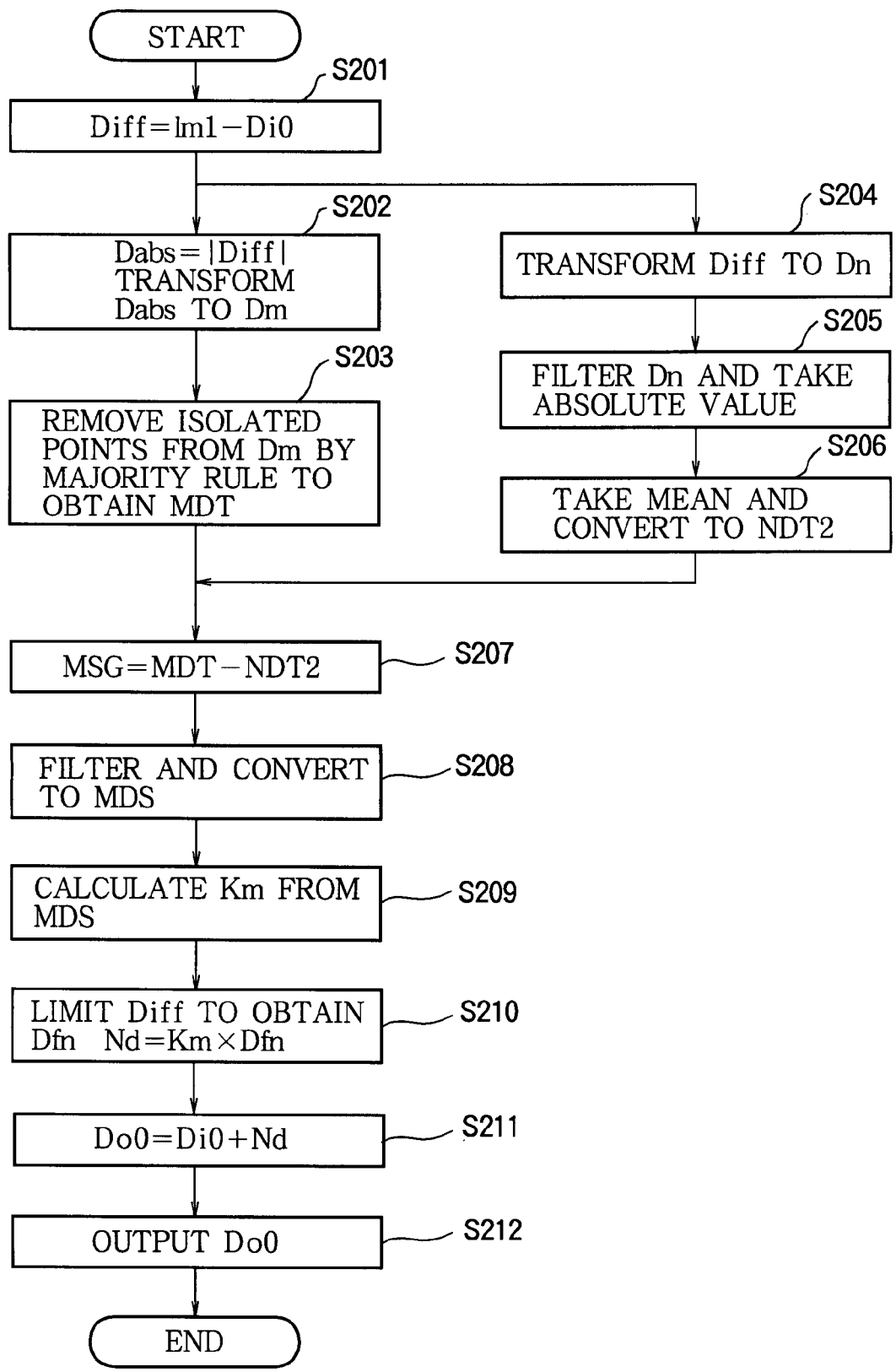
FIG. 13 is a flowchart illustrating the operation of the noise reducer in the second embodiment.

The second embodiment, illustrated by the block diagram in FIG. 12 and flowchart in FIG. 13, is a frame recursive noise reducer of this type.

Referring to FIG. 12, the noise reducer 2 in the second embodiment has the same frame memory 11, subtractor 12, amplitude limiter 13, coefficient calculation unit 16, multiplier 17, and adder 18 as in the first embodiment, but has a different motion and noise detector 15. The motion and noise detector 15 differs from the motion and noise detector 14 in FIG. 1 in regard to the internal structure of the noise decision unit 40.

As in the first embodiment, the motion level signal MDS output by the motion and noise detector 15 indicates how much of the frame-to-frame difference is due to motion. The motion and noise detector 15 comprises a motion level calculator 19 and a motion detector 20, which are the same as in the first embodiment, and a noise decision unit 40. The motion detector 20 adjusts the sensitivity of motion detection by transforming the frame-to-frame difference signal Diff to obtain a transformed difference signal Dm, and then processes the transformed difference signal Dm to obtain a motion detection signal MDT from which isolated noise has been removed. The noise decision unit 40 adjusts the sensitivity of noise detection by transforming the frame difference signal Diff to obtain a transformed difference signal Dn, then processes a high-frequency component of the transformed difference signal Dn to obtain a smoothed and sensitivity-adjusted noise detection signal NDT2 indicating the high-frequency noise level in the frame difference signal.

The frame memory 11 delays the noise-reduced video signal DoO by one frame, the subtractor 12 obtains the frame difference signal Diff expressing the difference between the current frame signal Di0 and the delayed video signal Im1, and the amplitude limiter 13 and the motion detector 20 in the motion and noise detector 15 operate as in the first embodiment, so a detailed description will be omitted.

The structure of the noise decision unit 40 in the motion and noise detector 15 will now be described. The noise decision unit 40 receives the frame difference signal Diff from the subtractor 12. The noise decision unit 40 detects noise components included in the frame difference signal Diff, and generates the noise detection signal NDT2 indicating the noise level. The noise decision unit 40 comprises a sensitivity converter 41 that nonlinearly transforms the frame difference signal Diff, a BPF 42 that extracts a high-frequency component of the transformed difference signal Dn, an absolute value calculator 43 that takes the absolute value of the high-frequency component at each pixel and outputs the absolute value as an absolute noise signal Nabs2, an averaging unit 44 that obtains an averaged noise signal Nave2 by taking the mean value of the absolute noise signal Nabs2 in a vicinity of each pixel, and a noise decision sensitivity converter 45 that nonlinearly transforms the averaged noise signal Nave2 to generate the noise detection signal NDT2.

The frame difference signal Diff includes both motion and noise components. As described in the first embodiment, to generate the motion detection signal MDT, the isolated point remover 23 in the motion detector 20 processes the transformed difference signal Dm so as to detect motion that was not indicated by the transformed difference signal Dm itself. Since the isolated point remover 23 may also detect noise as motion, the noise decision unit 40 detects noise components included in the frame difference signal Diff by detecting a high-frequency component of the frame difference signal Diff.

The sensitivity converter 41 in the noise decision unit 40 in the motion and noise detector 15 receives the frame difference signal Diff from the subtractor 12 and transforms it by a nonlinear process in which, for example, the frame difference signal Diff is multiplied by a predetermined difference sensitivity factor, a predetermined difference offset value is subtracted from the product, and the result is restricted to a predetermined range (e.g., from zero to a predetermined maximum quantity dN). The resulting transformed difference signal Dn is sent to the bandpass filter 42. This signal Dn includes both motion and noise components. By transforming the frame difference signal Diff separately, in obtaining the transformed difference signal Dm the difference sensitivity converter 22 in the motion detector 20 adjusts only the sensitivity of motion detection, and in obtaining a transformed difference signal Dn the sensitivity converter 41 adjusts only the sensitivity of noise detection.

When the sensitivity converter 41 nonlinearly transforms the frame difference signal Diff, the sensitivity converter 41 may take the absolute value of the frame difference signal Diff, and transform the absolute value nonlinearly to obtain the transformed difference signal Dn. The input-output characteristic of the sensitivity converter 41 in the nonlinear process may then be set as shown in the graph in FIG. 2.

The bandpass filter 42 in the noise decision unit 40 receives the transformed difference signal Dn from the sensitivity converter 41. The bandpass filter 42 extracts a high-frequency component of the transformed difference signal Dn. The high-frequency component is a noise component. In the following description it will be assumed, as an example, that the bandpass filter 42, like the bandpass filter 31 in the first embodiment, operates on a square nine-pixel area as shown in FIG. 7A, in which the pixel being processed is the shaded pixel in the center. Any pixel area may be used, however: for example, the pixel area may be a three-pixel horizontal area centered on the pixel being processed, as shown in FIG. 7B.

The absolute value calculator 43 in the noise decision unit 40 receives the output from the bandpass filter 42. The absolute value calculator 43 takes the absolute value of the high-frequency component at each pixel and outputs the absolute value as an absolute noise signal Nabs2.

The averaging unit 44 in the noise decision unit 40 receives the absolute noise signal Nabs2 from the absolute value calculator 43. The averaging unit 44 obtains an averaged noise signal Nave2 by taking the mean value of the absolute noise signal Nabs2 in a vicinity of each pixel. The purpose of this is to prevent artifacts at locations where the absolute noise signal Nabs2 is likely to change abruptly, as at moving edges. In the following description it will be assumed, as an example, that the averaging unit 44 takes the mean value of the absolute noise signal Nabs2 at five consecutive pixels constituting a one-by-five rectangular area. Any pixel area may be used, however.

The noise decision sensitivity converter 45 in the noise decision unit 40 receives the averaged noise signal Nave2 from the averaging unit 44 and transforms it by a nonlinear process in which, for example, the averaged noise signal Nave2 is multiplied by a predetermined noise sensitivity factor, a predetermined noise offset value is subtracted from the product, and the result is restricted to a predetermined range. The resulting noise detection signal NDT2 is sent to the subtractor 24 in the motion level calculator 19. The averaged noise signal Nave2 is a noise component extracted from the frame difference signal Diff. The greater the value of the averaged noise signal Nave2 is, the greater the likelihood that the transformed difference signal Dn is itself a noise component becomes. Increasing the slope (the noise sensitivity factor) thus increases the tendency of the noise detection signal to indicate the presence of noise in the transformed difference signal Dn.

The noise decision sensitivity converter 45 processes the averaged noise signal Nave2 nonlinearly, generates the noise detection signal NDT2, and outputs the generated noise detection signal NDT2 to the subtractor 24 in the motion level calculator 19. The noise detection signal NDT2 indicates the level of noise components included in the frame difference.

Next, the motion level calculator 19 in the motion and noise detector 15 receives the motion detection signal MDT from the motion detector 20 and the noise detection signal NDT2 from the noise decision unit 40. The motion level calculator 19 subtracts the noise detection signal NDT2 from the motion detection signal MDT to generate the motion level signal MDS indicating the motion level in the frame difference.

The frame difference signal Diff includes motion and noise components in the video signal. If noise is mistakenly detected as motion, much of the mistaken part of the motion detection signal MDT is removed when the noise detection signal NDT2 is subtracted. The part that is left is more easily recognizable as indicating a stationary pixel disturbed by noise, rather than a moving pixel. In this way motion can be distinguished from noise components in the frame difference.

The noise detection signal NDT2 is accordingly used by the motion level calculator 19 in the same way as the noise detection signal NDT in the first embodiment to generate the motion level signal MDS for input to the coefficient calculation unit 16. The coefficient calculation unit 16, multiplier 17, and adder 18 operate to reduce noise as in the first embodiment.

Next, the operations of processing the frame difference, detecting motion and noise in the video signal, obtaining the motion level signal MDS indicating the motion level in the frame difference, and setting the recursion coefficient Km according to the motion level signal MDS to reduce noise in the noise reducer 2 according to the second embodiment will be described more specifically.

The operations will be described in sequence with reference to the flowchart in FIG. 13.

In step S201, the subtractor 12 receives the current frame signal Di0 input to the noise reducer 2 and the video signal Im1 of the preceding frame obtained by the frame memory 11 by delaying the noise-reduced video signal DoO by one frame, and takes the difference between these signals Di0 and Im1 to obtain the frame difference signal Diff. The operation in step S201 is the same as in step S1 in FIG. 10. The amplitude limiter 13 limits the amplitude of the frame difference signal Diff to a predetermined range, and outputs the limited frame difference Dfn as a possible noise component.

In step S202, the absolute value calculator 21 in the motion detector 20 in the motion and noise detector 15 receives the frame difference signal Diff, and takes its absolute value Dabs. The difference sensitivity converter 22 transforms the absolute value Dabs nonlinearly to obtain the transformed difference signal Dm, and sends the transformed difference signal Dm to the isolated point remover 23 in the motion detector 20. The operation in step S202 is the same as in step S2 in FIG. 10.

In step S203, the isolated point remover 23 in the motion detector 20 processes the transformed difference signal Dm by applying a majority rule, using the values of the transformed difference signal Dm at pixels in an area surrounding the pixel being processed (the pixel of interest), corrects scatter in the values of the transformed difference signals at the surrounding pixels, decides whether the pixel of interest is moving or stationary, modifies the transformed difference signal Dm accordingly, and thereby generates the motion detection signal MDT. The operation in step S203 is the same as in step S3 in FIG. 10. The motion detection signal MDT, which indicates the motion level, is sent to the subtractor 24 in the motion level calculator 19.

In step S204, the sensitivity converter 41 in the noise decision unit 40 receives the frame difference signal Diff, transforms it nonlinearly to obtain the transformed difference signal Dn, and sends the transformed difference signal Dn to the bandpass filter 42. In step S205, the bandpass filter 42 extracts a high-frequency component of the transformed difference signal Dn. The high-frequency component is a noise component. The absolute value calculator 43 takes the absolute value of the high-frequency component at each pixel to obtain the absolute noise signal Nabs2. The operation in step S205 is the same as in step S4 in FIG. 10.

In step S206, the averaging unit 44 in the noise decision unit 40 receives the absolute noise signal Nabs2 from the absolute value calculator 43, and obtains the averaged noise signal Nave2 by taking the mean value of the absolute noise signal Nabs2 in a vicinity of each pixel. The noise decision sensitivity converter 45 receives the averaged noise signal Nave2, processes the averaged noise signal Nave2 nonlinearly, and generates the noise detection signal NDT2. The operation in step S206 is the same as in step S5 in FIG. 10. The noise detection signal NDT2 indicates the level of comparatively large noise components included in the frame difference.

The frame difference signal Diff includes both motion and noise components. As described above, to generate the motion detection signal MDT, the isolated point remover 23 in the motion detector 20 processes the transformed difference signal Dm so as to remove isolated values and detect motion that was not indicated by the transformed difference signal Dm itself. Since the isolated point remover 23 may also detect noise as motion, the noise decision unit 40 detects noise components included in the frame difference signal Diff by detecting a high-frequency component of the frame difference signal Diff, and decides whether the frame difference is due to noise. In this way motion can be distinguished from noise components in the frame difference In step S207, the subtractor 24 in the motion level calculator 19 receives the motion detection signal MDT and the noise detection signal NDT2, and subtracts the noise detection signal NDT2 from the motion detection signal MDT to generate a motion signal MSG. The operation in step S207 is the same as in step S6 in FIG. 10. If noise is mistakenly detected as motion, its level is reduced when the noise detection signal NDT2 is subtracted, so that what is left more closely indicates a stationary pixel. Noise components in the frame difference can therefore be distinguished by their low level.

Figure 10:
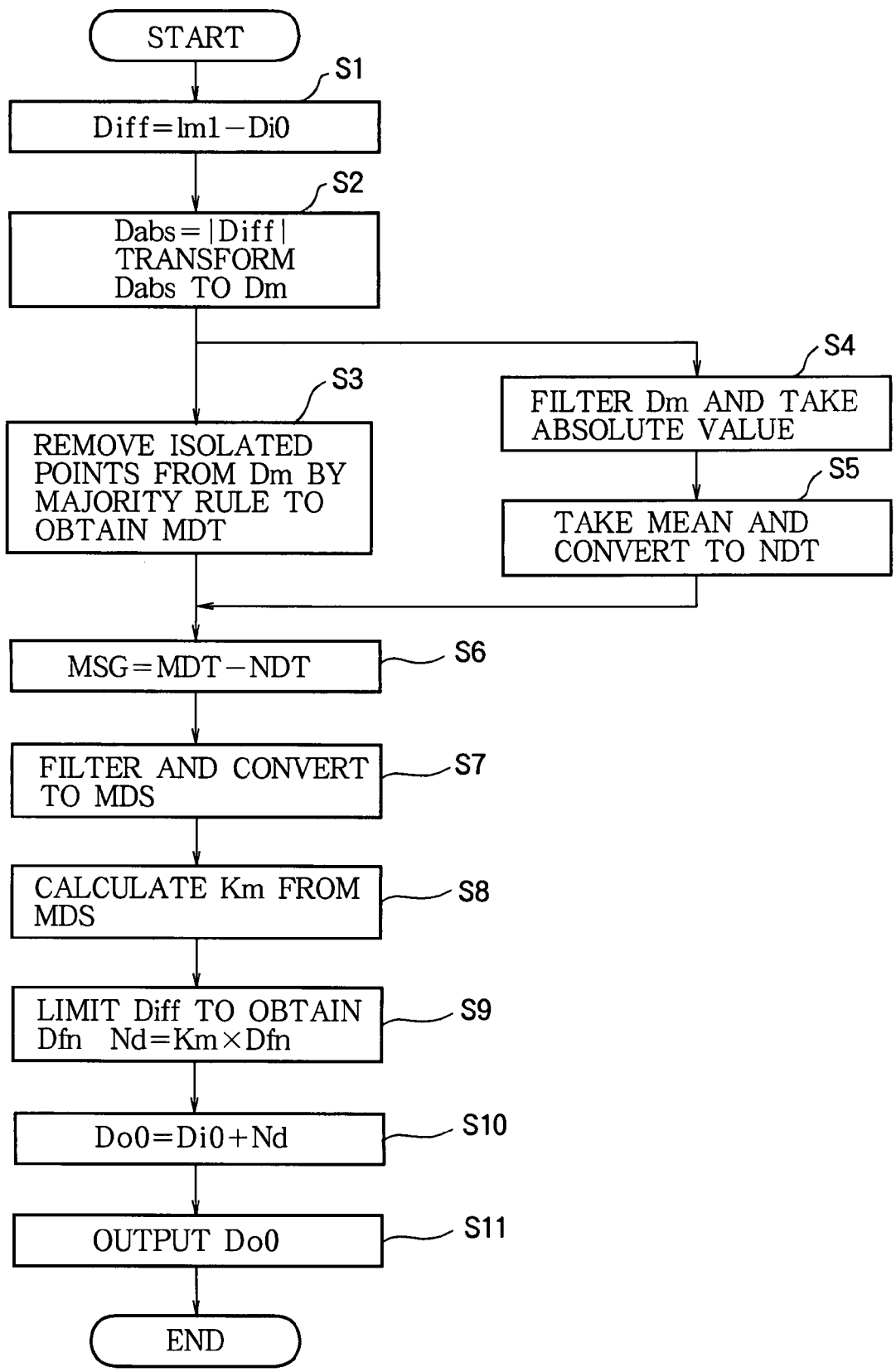
FIG. 10 is a flowchart illustrating the operation of the noise reducer in the first embodiment.

The operations for generating the motion level signal MDS in step S208, obtaining the recursion coefficient Km in step S209, obtaining the noise recursion quantity Nd in step S210, reducing noise in the video signal in step S211, and obtaining the noise-reduced output signal DoO in step S212 are the same as the operations from steps S7 to S11 in FIG. 10 in the first embodiment, so a detailed description will be omitted.

As described above, in the noise reducer 2 according to the second embodiment, the motion detector 20 transforms the frame difference signal Diff obtained in the subtractor 12 to obtain the transformed difference signal Dm and processes the transformed difference signal Dm to obtain the motion detection signal MDT, and the noise decision unit 40 extracts a noise component from the frame difference signal Diff to obtain the noise detection signal NDT2. The motion level signal MDS is obtained from the motion detection signal MDT and the noise detection signal NDT2 and the recursion coefficient Km is set according to the motion level signal MDS so as to reduce noise in the video signal. Accordingly, even if the video signal includes noise components with large values, these large noise components can be distinguished from motion in the frame difference so that they do not reduce the recursion coefficient unnecessarily. In stationary parts of the image, even if considerable noise is present, the recursion coefficient Km has its maximum value Kmax, providing maximum removal of the noise. In moving parts of the image, the recursion coefficient Km is reduced, reducing motion artifacts, regardless of the presence or absence of noise.

In a variation of the second embodiment, instead of delaying the noise-reduced video signal DoO output for the preceding frame, the frame memory 11 delays the input video signal Di0 by one frame, as in the nonrecursive noise reducer 10 in the variation of the first embodiment shown in FIG. 11. The frame difference signal Diff is then simply the difference between the input video signal in the current frame and the input video signal in the preceding frame. The motion and noise detector 15 remains unchanged.

Although the constituents of the noise reducer 2 were described above as hardware, the second embodiment may be realized by program control in software.

Third Embodiment

The noise reducer or noise reducing method described in the first or second embodiment may be used in a video signal display apparatus to reduce noise in an input video signal, in order to display a video picture with enhanced quality, as in the third embodiment described below.

The video signal display apparatus in the third embodiment has the block structure illustrated in FIG. 14, including the noise reducer 1 in the first embodiment, the nonrecursive noise reducer 10 in the variation of the first embodiment, or the noise reducer 2 in the second embodiment. The video signal display apparatus also includes an input terminal 301, an input signal processor 302, a display processor 303, and a display unit 304 on which the noise-reduced video signal output by the noise reducer 1, the nonrecursive noise reducer 10, or the noise reducer 2 is displayed. The noise reducer 1, 10, or 2 operates as in the preceding embodiments, so a detailed description will be omitted.

The input terminal 301 receives a broadcast television (TV) signal or a video signal from a video source such as a digital versatile disc (DVD) player or recorder, video cassette recorder (VCR), or television tuner or descrambler.

The input signal processor 302 processes the received TV signal or other video signal: if the received signal is an analog signal, for example, the input signal processing may include analog-to-digital conversion and separation of the synchronizing signal; if the received signal is a digital signal coded according to the standard established by the Motion Picture Experts Group (MPEG), the input signal processing may include decoding the MPEG data. The processed signal output by the input signal processor 302 to the noise reducer 1, 2, or 10 may be an interlaced signal or a progressive signal.

In the noise reducer 1, 2, or 10, the subtractor 12 takes the difference between the video signal of the current frame from the input signal processor 302 and the video signal or noise-reduced video signal of the preceding frame to obtain a frame difference signal Diff, the motion detector 20 transforms the frame difference signal Diff obtained in the subtractor 12 to obtain a transformed difference signal Dm and processes the transformed difference signal Dm to obtain a motion detection signal MDT, and the noise decision unit 30 or 40 extracts a noise component from the difference signal Diff or transformed difference signal Dm to obtain a noise detection signal NDT or NDT2. A motion level signal MDS is obtained from the motion detection signal MDT and the noise detection signal NDT or NDT2, a recursion coefficient Km is obtained from the motion level signal MDS, noise in the video signal is reduced recursively or non-recursively, and the noise-reduced video signal is output to the display processor 303. The detailed operation of the noise reducer 1, 2, or 10 is as described in the first or second embodiment, or the variation of the first embodiment.

The display processor 303 processes the noise-reduced video signal received from the noise reducer 1, 2, or 10 to obtain a signal suitable for display on the display unit 304. The processing may include, for example, interlaced-to-progressive conversion and/or scaling. The resulting display signal is sent to the display unit 304.

The display unit 304 displays a noise-reduced picture on a screen according to the display signal output from the display processor 303.

By using the noise reducer of the first or second embodiment, the video signal display apparatus 3 in the third embodiment is able to display a substantially noise-free picture without unwanted motion artifacts, regardless of the amount of noise present in the received video signal and the amount of motion present in the picture.

In the first, second, and third embodiments described above, all of the constituent elements may be hardware circuits or devices, or some of the elements may be implemented by software.

Those skilled in the art will recognize that further variations are possible within the scope of the invention, which is defined in the appended claims.

What is claimed is:

1. A noise reducer of the three-dimensional type for reducing noise components lacking frame-to-frame correlation in a video signal representing values of pixels, the noise reducer comprising:

a subtractor for receiving the video signal of a current frame and the video signal of a preceding frame or a noise-reduced video signal output from the noise reducer in the preceding frame, taking a difference between the video signal of the current frame and the video signal of the preceding frame, or a difference between the video signal of the current frame and the noise-reduced signal output from the noise reducer in the preceding frame, and outputting the difference as a frame difference signal;

a motion detector for processing the frame difference signal to detect motion in the video signal and derive a motion detection signal indicating a motion level for each pixel;

a noise decision unit responsive to the frame difference signal for extracting a high-frequency component of the frame difference signal for each pixel, processing the high-frequency component to detect noise in the video signal, and outputting a noise detection signal indicating a noise level for each pixel;

a motion level calculator for deriving a motion level signal for each pixel from the motion detection signal and the noise detection signal by a process that includes at least taking a difference between the motion detection signal and the noise detection signal;

a coefficient calculation unit for converting the motion level signal to a recursion coefficient;

a multiplier for multiplying the frame difference by the recursion coefficient to obtain a noise recursion quantity; and an adder for additively combining the noise recursion quantity and the video signal of the current frame to obtain a noise-reduced video signal for the current frame and outputting the noise-reduced video signal.

2. The noise reducer of claim 1, wherein the motion detector comprises:

an absolute value calculator that takes the absolute value of the frame difference signal output from the subtractor to obtain an absolute frame difference signal;

a difference sensitivity converter that nonlinearly transforms the absolute frame difference signal by a process including multiplication by a predetermined motion sensitivity factor and subtraction of a predetermined motion offset value to obtain a transformed difference signal;

an isolated point remover that performs a majority rule process on the transformed difference signals, using pixels surrounding a pixel of interest, to decide as to whether the pixel of interest is moving or stationary, and modifies the transformed difference signal according to results of the majority rule process to obtain the motion detection signal.

3. The noise reducer of claim 2, wherein the noise decision unit comprises:

a bandpass filter that receives the transformed difference signal from the difference sensitivity converter and extracts a high-frequency component of the transformed difference signal;

an absolute value calculator that takes an absolute value of the high-frequency component extracted by the bandpass filter and outputs the absolute value as an absolute noise signal;

an averaging unit that averages the absolute noise signal in a vicinity of the pixel of interest to obtain an averaged noise signal; and a noise decision sensitivity converter that processes the averaged noise signal by multiplication by a predetermined noise sensitivity factor and subtraction of a predetermined noise offset value to generate the noise detection signal.

4. The noise reducer of claim 2, wherein the isolated point remover comprises:

a moving pixel decision unit that compares the transformed difference signal with a first predetermined value to recognize pixels at which motion has occurred and output a moving pixel signal identifying said pixels as moving pixels;

a stationary pixel decision unit that compares the transformed difference signal with a second predetermined value to recognize pixels at which motion has not occurred and output a stationary pixel signal identifying said pixels as stationary pixels;

a moving pixel counter for receiving the moving pixel signal and counting the number of moving pixels in an area around the pixel of interest to obtain a moving pixel count;

a stationary pixel counter for receiving the stationary pixel signal and counting the number of stationary pixels in the area around the pixel of interest to obtain a stationary pixel count;

a first comparator for comparing the moving pixel count with a third predetermined value to obtain a first comparison result;

a second comparator for comparing the stationary pixel count with a fourth predetermined value to obtain a second comparison result; and a majority decision unit for modifying the transformed difference signal according to the first comparison result and the second comparison result to obtain the motion detection signal.

5. The noise reducer of claim 4, wherein the majority decision unit comprises:

a first condition adder for adding a fifth predetermined value to the transformed difference signal to obtain an upwardly corrected difference signal;

a second condition adder for subtracting a sixth predetermined value from the transformed difference signal to obtain a downwardly corrected difference signal; and a selector for selecting one of the transformed difference signal, the upwardly corrected difference signal, the downwardly corrected difference signal, and a fixed value according to the first comparison result and the second comparison result to obtain the motion detection signal.

6. The noise reducer of claim 1, wherein the motion level calculator comprises:

a noise subtractor for taking a difference between the motion detection signal and the noise detection signal to obtain a motion signal;

a low-pass filter for spatially filtering the motion signal to obtain a spatially broadened signal; and a motion level converter for transforming the spatially broadened signal to obtain the motion level signal.

7. The noise reducer of claim 1, wherein the coefficient calculation unit varies the recursion coefficient between zero and unity so that as the motion level signal increases up to a certain value, the recursion coefficient decreases to zero, and when the motion level signal exceeds the certain value, the recursion coefficient is equal to zero.

8. The noise reducer of claim 7, wherein the coefficient calculation unit comprises:

a slope setter for setting a slope with which the recursion coefficient varies with respect to the motion level signal;

a maximum coefficient setter for setting a maximum value of the recursion coefficient;

a coefficient calculator for calculating a preliminary value from the motion level signal and said slope; and a coefficient limiter for limiting the preliminary value according to the maximum value to obtain the recursion coefficient.

9. The noise reducer of claim 1, wherein the noise decision unit comprises:

a sensitivity converter that receives the difference signal from the subtractor and nonlinearly transforms the difference signal by a process including multiplication by a predetermined difference sensitivity factor and subtraction of a predetermined difference offset value to obtain a transformed difference signal;

a bandpass filter that extracts a high-frequency component from the transformed difference signal;

an absolute value calculator that takes an absolute value of the high-frequency component extracted by the bandpass filter to obtain an absolute noise signal;

an averaging unit that averages the absolute noise signals of pixels in a vicinity of a pixel of interest to obtain an averaged noise signal; and a noise decision sensitivity converter that nonlinearly transforms the averaged noise signal by a process including multiplication by a predetermined noise sensitivity factor and subtraction of a predetermined noise offset value to obtain the noise detection signal.

10. A video signal display apparatus comprising the noise reducer of claim 1, a display unit, and a display processor for displaying the noise-reduced video signal output by the noise reducer on the display unit.

11. A three-dimensional noise reduction method for reducing noise components lacking frame-to-frame correlation in a video signal including successive frames of picture elements, comprising:

receiving the video signal of a current frame and the video signal of the preceding frame or a noise-reduced video signal of the preceding frame, and taking a difference between the video signal of the current frame and the video signal of the preceding frame, or a difference between the video signal of the current frame the noise-reduced signal output from the noise reducer in the preceding frame;

processing the frame difference signal to detect motion in the video signal and derive a motion detection signal indicating a motion level for each pixel;

extracting a high-frequency component of the frame difference signal for each pixel, processing the high-frequency component to detect noise in the video signal, and outputting a noise detection signal indicating a noise level for each pixel;

obtaining a motion level signal for each pixel from the motion detection signal and the noise detection signal by a process that includes at least taking a difference between the motion detection signal and the noise detection signal;

converting the motion level signal to a recursion coefficient;

multiplying the frame difference signal by the recursion coefficient to obtain a noise recursion quantity; and additively combining the noise recursion quantity and the video signal of the current frame to obtain and output a noise-reduced video signal for the current frame.

12. The three-dimensional noise reduction method of claim 11, wherein processing the frame difference signal to detect motion in the video signal includes nonlinearly transforming an absolute value of the frame difference signal to generate a transformed frame difference signal.

13. The three-dimensional noise reduction method of claim 12, wherein nonlinearly transforming an absolute value of the frame difference signal further comprises:

setting the transformed frame difference signal to zero when the absolute value of the frame difference signal is less than a first predetermined value;

increasing the transformed frame difference signal to a predetermined maximum value as the absolute value of the frame difference signal increases from the first predetermined value to a second predetermined value; and setting the transformed frame difference signal to the maximum value as the absolute value of the frame difference signal increases beyond the second predetermined value.

14. The three-dimensional noise reduction method of claim 12, wherein the high-frequency component is extracted from the transformed frame difference signal.

15. The three-dimensional noise reduction method of claim 11, further comprising:

taking a mean absolute value of the extracted high-frequency component in a vicinity of each picture element of the video signal; and nonlinearly transforming the mean absolute value to generate the noise detection signal.

16. The three-dimensional noise reduction method of claim 15, wherein nonlinearly transforming the mean absolute value further comprises:

multiplying the mean absolute value by a predetermined noise sensitivity factor to obtain a first value;

subtracting a predetermined noise offset value from the first value to obtain a second value; and restricting the second value to a predetermined range.

17. The three-dimensional noise reduction method of claim 11, wherein extracting the high-frequency component of the frame difference signal further comprises:

passing the frame difference signal through a bandpass filter.

18. The three-dimensional noise reduction method of claim 11 wherein obtaining the motion level signal further comprises:

low-pass filtering of the difference between the motion detection signal and the noise detection signal to obtain a spatially broadened signal;

setting the motion level signal to a predetermined maximum value if the spatially broadened signal exceeds a predetermined value;

reducing the motion level signal as the spatially broadened signal decreases from the predetermined value to zero; and setting the motion level signal to zero if the spatially broadened signal is equal to or less than zero.

19. The three-dimensional noise reduction method of claim 11, wherein converting the motion level signal to the recursion coefficient further comprises:

setting the recursion coefficient to a predetermined maximum value if the motion level signal is less than a first predetermined value;

reducing the recursion coefficient as the motion level signal increases from the first predetermined value to a second predetermined value; and setting the recursion coefficient to zero if the motion level signal is equal to or greater than the second predetermined value.

* * * * *